US010031640B2

(12) United States Patent
Hilton et al.

(10) Patent No.: US 10,031,640 B2
(45) Date of Patent: Jul. 24, 2018

(54) HIERARCHICAL FILTERING USING SPATIAL BOUNDARY OF 3D OBJECTS

(71) Applicant: Intergraph Corporation, Madison, AL (US)

(72) Inventors: Douglas S. Hilton, Huntsville, AL (US); Anthony D. Boster, Hartselle, AL (US)

(73) Assignee: Hexagon Technology Center GmbH, Heerbrugg (CH)

( * ) Notice: Subject to any disclaimer, the term of this patent is extended or adjusted under 35 U.S.C. 154(b) by 533 days.

(21) Appl. No.: 14/823,401

(22) Filed: Aug. 11, 2015

(65) Prior Publication Data
US 2015/0346949 A1    Dec. 3, 2015

Related U.S. Application Data

(62) Division of application No. 12/813,253, filed on Jun. 10, 2010, now Pat. No. 9,158,441.
(Continued)

(51) Int. Cl.
*G06F 3/0481* (2013.01)
*G06T 11/60* (2006.01)
(Continued)

(52) U.S. Cl.
CPC ........ *G06F 3/04815* (2013.01); *G06F 3/0481* (2013.01); *G06F 3/0482* (2013.01);
(Continued)

(58) Field of Classification Search
CPC .......................... G06F 3/04815; G06F 3/0486
See application file for complete search history.

(56) References Cited

U.S. PATENT DOCUMENTS 5,720,018 A    2/1998  Muller et al. ................. 395/133
5,880,778 A    3/1999  Akagi ........................... 348/218
(Continued)

FOREIGN PATENT DOCUMENTS

CN    1910621 A    2/2007
CN    101243474 A   8/2008

OTHER PUBLICATIONS

McGuinness, D., "Ontologics Come of Age," Spinning the Semantic Web: Bringing the World Wide Web to Its Full Potential, MIT Press, 13 Pages, 2003.
(Continued)

*Primary Examiner* — Anil Bhargava
(74) *Attorney, Agent, or Firm* — Sunstein Kann Murphy & Timbers LLP

(57) ABSTRACT

Methods and apparatus are provided that improve graphical software applications, by filtering the data for display according to techniques for defining and manipulating visual indicia. Data may be filtered according to multiple filters that are combined in a number of ways to form the set of data for display. Data may be filtered ontologically and geometrically according to their relationships with other data. Visual indicia that represent filters may be drag-and-dropped between input areas to facilitate ease of use. Data selected according to a filter may be displayed at the same time as non-selected data by applying visually distinctive characteristics to the selected data. A virtual environment may be shown simultaneously on several different video displays at a single workstation.

17 Claims, 22 Drawing Sheets

Related U.S. Application Data

(60) Provisional application No. 61/185,912, filed on Jun. 10, 2009, provisional application No. 61/267,956, filed on Dec. 9, 2009.

(51) Int. Cl.
*G06F 17/30* (2006.01)
*G06F 3/0484* (2013.01)
*G06F 3/0482* (2013.01)
*G06F 3/0486* (2013.01)

(52) U.S. Cl.
CPC ........ *G06F 3/0486* (2013.01); *G06F 3/04842* (2013.01); *G06F 17/30867* (2013.01); *G06T 11/60* (2013.01)

(56) References Cited

U.S. PATENT DOCUMENTS

| | | | |
|---|---|---|---|
| 6,212,441 B1* | 4/2001 | Hazama | G05B 19/4097 345/420 |
| 6,756,998 B1* | 6/2004 | Bilger | H04L 12/2803 715/734 |
| 7,176,942 B2 | 2/2007 | Chartier et al. | 345/619 |
| 7,283,136 B2 | 10/2007 | Chartier et al. | 345/440 |
| 2002/0180735 A1 | 12/2002 | Chartier et al. | 345/440 |
| 2005/0131938 A1 | 6/2005 | Sabadell et al. | 707/103 |
| 2005/0140688 A1 | 6/2005 | Pallister | 345/582 |
| 2006/0074836 A1* | 4/2006 | Gardner | G06N 5/02 706/60 |
| 2006/0116994 A1* | 6/2006 | Jonker | G06F 17/30017 |
| 2006/0170675 A1 | 8/2006 | Woo et al. | 345/419 |
| 2007/0013709 A1* | 1/2007 | Charles | G06F 17/50 345/581 |
| 2007/0100790 A1* | 5/2007 | Cheyer | G09B 21/00 |
| 2007/0180425 A1* | 8/2007 | Storms | G06F 17/5004 717/104 |
| 2007/0180525 A1 | 8/2007 | Bagnall | 726/23 |
| 2008/0033897 A1* | 2/2008 | Lloyd | G06F 9/4488 706/19 |
| 2009/0013271 A1* | 1/2009 | Helfman | G06F 17/30572 715/764 |
| 2009/0076887 A1* | 3/2009 | Spivack | G06Q 30/02 705/14.69 |
| 2009/0160856 A1* | 6/2009 | Hoguet | G06Q 10/06 345/420 |
| 2010/0095230 A1* | 4/2010 | Maillot | G06F 17/5004 715/763 |
| 2010/0149214 A1 | 6/2010 | Wiemker et al. | 345/643 |
| 2011/0264649 A1* | 10/2011 | Hsiao | G06N 5/022 707/722 |

OTHER PUBLICATIONS

Korean Intellectual Property Office, International Search Report and Written Opinion for International Application No. PCT/US2010/038188, dated Jan. 3, 2011, 10 pages.

United States Patent and Trademark Office, Notice of Allowance and Fees Due—U.S. Appl. No. 14/823,493, dated Feb. 6, 2018, 15 pages.

* cited by examiner

310

| Class | Pipe | | |
|---|---|---|---|
| Tag/name | P101-014 | | |
| Diameter | 8" | | |
| X1 | 10 | X2 | 15 |
| Y1 | 20 | Y2 | 25 |
| Z1 | 30 | Z2 | 35 |
| Ontology | Pipe; Heat riser | | |

320

| Class | Pipe | | |
|---|---|---|---|
| Tag/name | P102-0146 | | |
| Diameter | 4" | | |
| X1 | 100 | X2 | 110 |
| Y1 | 120 | Y2 | 130 |
| Z1 | 140 | Z2 | 150 |
| Ontology | Pipe; Fuel line; JP-4 | | |

330

| Class | Pipe | | |
|---|---|---|---|
| Tag/name | P104-018 | | |
| Diameter | 2.5" | | |
| X1 | 210 | X2 | 230 |
| Y1 | 220 | Y2 | 240 |
| Z1 | 230 | Z2 | 250 |
| Ontology | Pipe; Fresh water | | |

FIG. 3

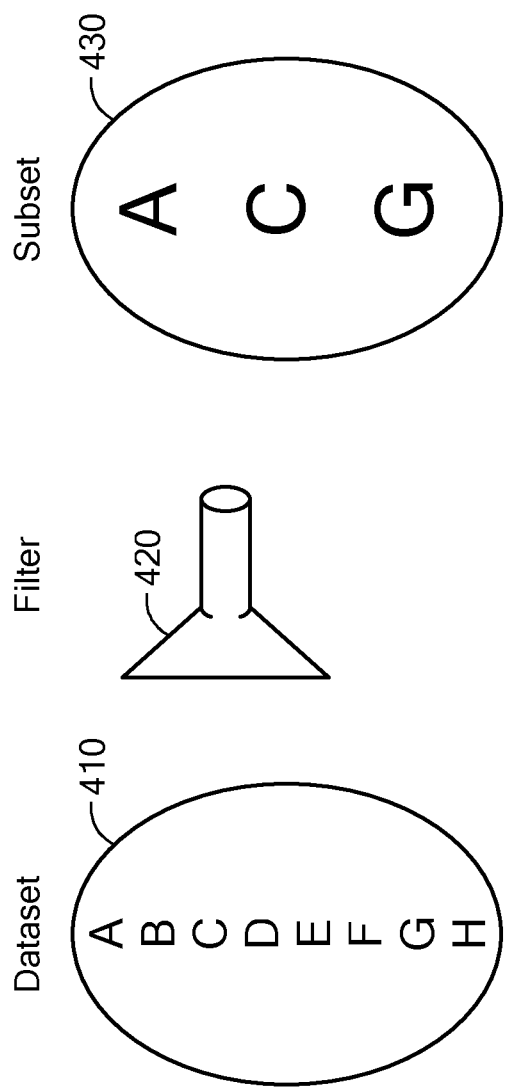

HIERARCHICAL FILTERING USING SPATIAL BOUNDARY OF 3D OBJECTS

CROSS-REFERENCE TO RELATED APPLICATIONS

This application is a divisional application of U.S. application Ser. No. 12/813,253, filed Jun. 10, 2010, which claims the benefit of both U.S. Provisional Application No. 61/185,912, filed Jun. 10, 2009, and U.S. Provisional Application No. 61/267,956, filed Dec. 9, 2009. The contents of these applications are hereby incorporated by reference in their entirety, as if fully set forth herein.

TECHNICAL FIELD

Embodiments of the present invention relate to the graphical display of information on a video display, and more particularly to improving the usability of interactive graphical modeling software applications whose visual displays are backed by large amounts of data.

BACKGROUND ART

People rely heavily on the meanings that they attach to certain objects. A "pipe" may go from one side of a room to the other side, but if it carries jet fuel, it is called a "fuel-line." Another "pipe" may go from floor to ceiling in the same room, but because it is used to evacuate heat from a steam boiler in a lower floor, it is called a "heat riser." Design engineers understand the deep meaning of "heat riser" and "fuel line," and they know that a "heat riser" should not be within close proximity of a "fuel line" lest there be explosion or fire. However, a casual observer might only think of both objects as "pipes." Data about both pipes may be stored in a computer database, with other attributes, such as length and diameter.

Many interactive, graphical computer software applications process vast amounts of complex three-dimensional model data for presentation on one or more video displays. Such applications include, for example, computer-assisted design (CAD) tools for designing three-dimensional articles, buildings, and vehicles for manufacture, and geographic information system (GIS) tools, which are used to track public transit systems or communications networks. Typically, an individual will use such programs at a workstation or computer terminal, as shown in FIG. 1. As can be seen in FIG. 1, the workstation may have several video displays, arranged at the convenience of the individual, to allow the individual a large display area on which to operate software applications.

SUMMARY OF ILLUSTRATIVE EMBODIMENTS

Various embodiments of the invention improve upon such graphical software applications, among other ways, by allowing an individual to associate an ontological classification to graphical object data, apart from or in addition to their physical characteristics. The data may then be filtered for display according to the ontology, and displayed using well-known techniques for defining and manipulating visual indicia on graphical displays. Further, by filtering objects based not just on the ontology, but on their geometric properties as well, complex and important questions relating to safety or operations may be posed. Answers to these questions may be suggestive of other data that the requester would consider closely-related to his own mental model of the complete data set, improving ease-of-use of the graphical software and providing an intuitive interface.

In a first embodiment of the invention, a method displays 3D model data that has been filtered using multiple software filters. The data belong to a dataset, with each datum in the dataset having one or more attributes. First, the method defines a plurality of data filters and a plurality of filtering levels. Each data filter is characterized by a filtering level, or priority, and is capable of filtering the data in the dataset as a function of at least one attribute. In response to receiving a first selection of a plurality of data filters, the method then displays a subset of 3D model data in the dataset that is defined by the first selected data filters.

In some embodiments, the data filters may be organized as a tree, or carry ontological meanings. The selected data filters may have the same filtering level, or have different filtering levels. The subset of displayed data may be formed from the logical intersection or logical union of the subsets of data defined by the selected data filters. Data selected by a given data filter may be displayed in a user-selectable color that is uniquely associated with the filter. For example, all "fuel lines" may appear e.g., red indicia on the user display area.

Other related methods may extend this process. For example, one method receives a second selection of a first selected data filter. The method then indicates data filters associated with the re-selected data filter. Each indicated data filter has the same level, but that level is different from the re-selected filter's level. The method may then receive a selection of an indicated data filter. In this case, the method causes the display of a second subset of 3D model data defined by the selected, indicated data filter.

The second subset of 3D model data may be defined not just by the selected, indicated data filter, but also by the other, first-selected data filters. Displaying the second subset may include displaying the data of the second subset in a user-selectable color. And displaying the second subset may include displaying an exploded view, a cross-sectional view, or an enlarged view of the data of the second subset.

In another embodiment of the invention, a method displays, on a video display, 3D model data from a dataset. Each datum in the dataset represents an instance of a class in a plurality of classes of 3D model objects. Each class in the plurality of classes realizes at least one functional role in a plurality of functional roles. The method includes, first, forming an ontology that defines a plurality of meanings, where each role in the plurality of functional roles possesses at least one of the meanings. The method next displays a graphical user interface (GUI) on the video display, where the GUI is capable of receiving a selection of a meaning in the ontology. Finally, the method determines, for display, 3D model data from the dataset on the video display in response to receiving a meaningful selection. Each displayed datum is an instance of a class that realizes a role having the selected meaning. These concepts are elaborated in the description of FIG. 9, below.

A number of meanings may be selected to perform plural filtering. If so, the method further displays the data in the dataset that are instances of classes that realize at least one role having at least one of the selected meanings. The 3D model data may be displayed in a user-selectable color. Further, the method may include displaying the other, unselected 3D model data. Displaying the data on the video display includes displaying the selected data differently than the unselected data.

Another method provides a drag-and-drop method of selecting, from a dataset, 3D model data for display. Each datum in the dataset has one or more meanings, and each meaning is associated with a visual indicium. This method displays, on a video display, first and second regions having visual indicia. Each visual indicium is capable of being drag-and-dropped between the two regions. In response to a drag-and-drop event, the method selects, for display on the video display, 3D model data based on the visual indicia displayed in the second display region.

Visual indicia may be drag-and-dropped from either region to the other. Each visual indicium may have a user-selectable display color. Data in the dataset may be related to other data in the dataset according to an ontology that describes the dataset. If so, at least one of the visual indicia may be associated with a filter for selecting all data in the dataset that responds to a particular meaning within the ontology. In response to a visual indicium being drag-and-dropped between regions, another method organizes the visual indicia displayed in the second region. The method may organize the visual indicia according to a frequency with which the visual indicia appear in the second display region, or according to sort-criteria selectable by a user.

A related method displays selected data on the video display. Further, the method may display data that is not selected. The selected data is displayed according to a display mode that visually distinguishes it from the non-selected data. Each visual indicium may have a different, user-selectable color. According to the display mode, data associated with each visual indicium may be displayed in the color of that visual indicium.

Another method displays 3D model data from a dataset on a video display according to various display options. This method applies at least one data filter to the dataset to select a subset of 3D model data, then shows selectable display options pertaining to the filter. After receiving an option selection from an individual, the method displays the 3D objects according to the selected data display option. The selected data may be displayed in a user-selectable color, and the data selected by each filter may be displayed in a different color. The unselected data may or may not be displayed, and if they are, they may be displayed in, e.g., a neutral color.

A related method embodiment further selects a displayed subset of data, and displays each object in the subset in a user-selectable highlight color. This embodiment may be extended by drag-and-dropping the data displayed in the highlighted color from the video display onto a second video display.

A further embodiment provides a method of displaying data on a video display based on both its ontological and geometrical properties. The method includes assigning at least one meaning to each datum in the set of data, the collection of all assigned meanings forming an ontology. In a computer process, the method requires determining first and second subsets of the data that correspond to first and second meanings in the ontology, and forming a third subset of the set of data; the third subset comprising each datum in the first subset that satisfies a given geometric relationship with at least one datum in the second subset. Finally, the method requires forwarding a signal toward the video display to cause it to graphically highlight the three-dimensional objects represented by the third subset.

The data may represent three-dimensional objects that are used in the design, construction, inspection, licensing, or operation of, e.g., a building, a naval vessel, etc. They may be stored in a database, and determining the first and second subsets of the set of data are performed using a database query. The video display may show the three-dimensional objects in a two-dimensional view or in a three-dimensional view. And graphically highlighting the third subset of three-dimensional objects may include displaying copies of a visual indicium at appropriate locations in the display.

Computer program products for performing each of these methods are also disclosed. Each computer program product is a tangible, computer-usable medium, which carries program code. The code instructs a computer system to carry out the steps of one of the methods described above. A single computer-usable medium may include program code to carry out any or all of the methods. Further, apparatus for performing these methods is disclosed.

BRIEF DESCRIPTION OF THE DRAWINGS

The foregoing embodiments of the invention will be more readily understood by reference to the detailed description thereof, and the accompanying drawings, in which:

FIG. 3 is a tabular representation of several data having both attributes and ontological classifications;

FIG. 4 graphically depicts the logical operation of a data filter acting on a dataset;

Figure 1:
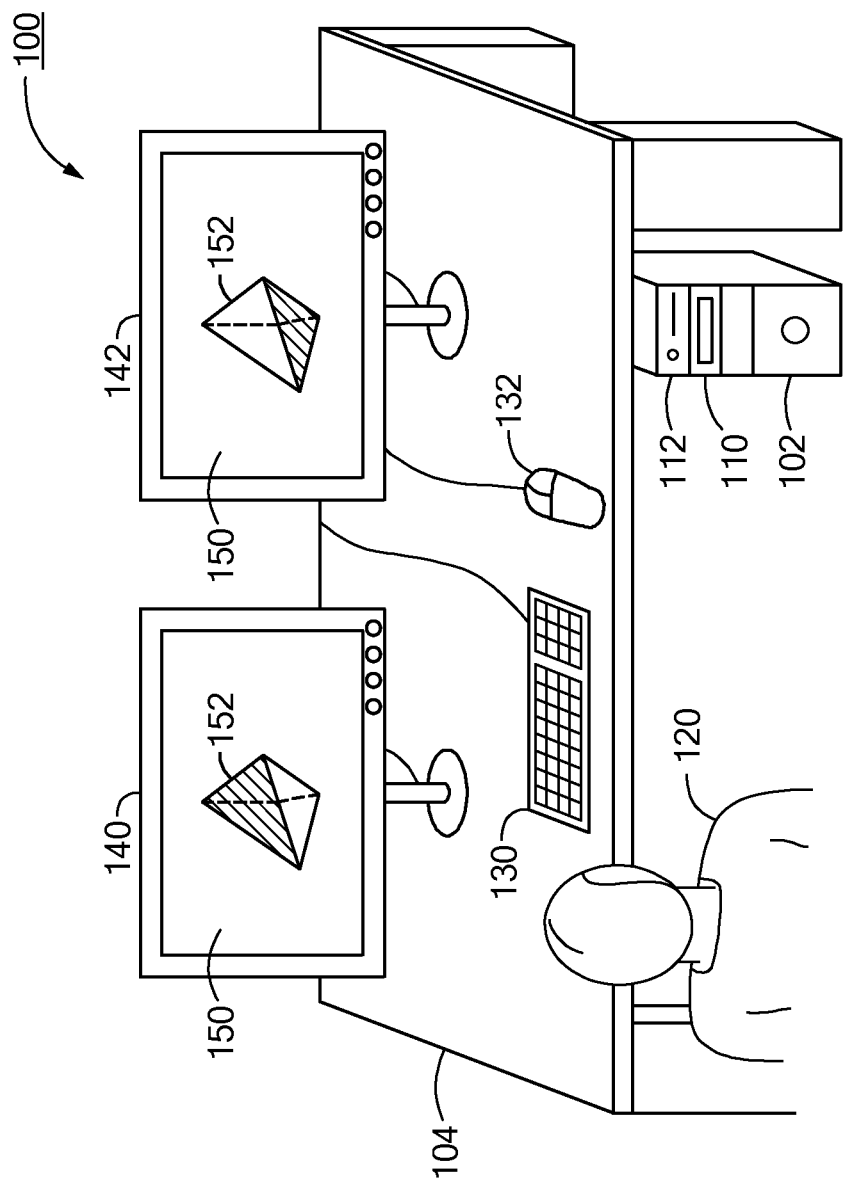
FIG. 1 schematically shows an individual preparing to use a computer workstation in accordance with some embodiments of the invention.

It is to be understood that the figures are not necessarily drawn to scale, and that they are conceptual and illustrative in nature.

DETAILED DESCRIPTION OF SPECIFIC EMBODIMENTS

Many interactive, graphical computer software applications process vast amounts of complex three-dimensional model data for presentation on one or more video displays. Such applications include, for example, computer-assisted design (CAD) tools for designing three-dimensional articles, buildings, and vehicles for manufacture, and geographic information system (GIS) tools, which are used to track public transit systems or communications networks. Various embodiments of the invention improve these applications by filtering the data for display according to easy-to-use and easy-to-understand techniques for defining and manipulating visual indicia on the graphical displays.

For example, how can a design engineer tell that two similar objects, both called "pipes" are actually quite different, and indeed should not be placed in close proximity of each other? One way is to store the objects with an ontological classification so that their "deep meaning" remains attached to them.

Generally speaking, user-developed classifications, e.g., "heat riser" and "fuel line" are a good way to informally categorize and organize data for subsequent filtering and query from a computer database. The process of developing formal or informal categorizations of objects results in the ontology of that domain, which includes the collection of meanings that have been associated with a particular object or concept. This collection of meanings may grow and change throughout the existence of the object. For example, a chair may be a "place to sit." If a ceiling light burns out and needs changing, the chair can become a "stepping stool." If it is moved to block a door, the chair can become a "fire hazard." While the chair itself has not physically changed, the variety of uses it has acquired and the roles it performs are reflected in different meaningful words and phrases, or "labels," that we use to mentally model and describe it. These labels form its ontology. Ontologies can provide a different kind of organizational structure in large and complex human endeavors, where "tagging" objects is more useful than the traditional approach of associating properties with keys, as is done with normalized databases.

As used herein, the term "ontology" generally refers to a collection of meanings that are associated with an object or a concept. As illustrated in the above discussion, a pipe may have deep meanings, such as "fuel line" or "heat riser." These meanings form part of that pipe's ontology, along with other words and phrases that are semantically descriptive of the pipe. Anything that can be named has an associated ontology, full of meanings. The meanings themselves may be represented, in various embodiments of the invention disclosed herein, by data stored in a database or in a software configuration file. Ontologies should not be confused with physical attributes—while a particular pipe may have a certain diameter, and while "six-inch diameter pipe" (for example) may have a deep meaning with respect to a particular technology or application, ontologies in general are not so limited. Rather, ontologies embody the variously named aspects and features of objects that people assign to them in their own mental models.

Also as used herein, the term "drag-and-drop" generally refers to a three step process for moving objects on a graphic display using a pointing device, such as a computer mouse or graphics tablet. In the first step, an operator "grabs" an object by maneuvering a displayed pointer over the object and performing a grabbing action, typically pressing (without releasing) a button on the pointing device. In the second step, the operator "drags" the object by maneuvering the pointer to a desired location. In the third step, the operator "drops" the object into that location by performing a dropping action, typically releasing the held button. A person having ordinary skill in the art will recognize other methods of performing this function, such as pressing and releasing an "action" button once in the first step to grab the object and once again in the third step to drop it, or using separate "grab" and "drop" buttons on the keyboard or pointing device.

The software applications described herein operate generally by manipulating and displaying data that represent a number of physical objects having length, breadth, and height. In some embodiments of the invention, these applications also include data that represent the semantic meanings of these physical objects to their users (i.e., their ontologies). As examples, the data may represent the physical properties of each component in, among other things: a chemical, mining, or manufacturing plant; an oil, gas, or nuclear power station; or even an automobile or a naval vessel. As used herein, the terms "three-dimensional" and "3D" interchangeably refer to both the data that model the properties of these physical objects, and the graphical data that a computer application uses to visually display the model data on a graphical display. While a typical embodiment of the invention will use a video display device such as a CRT or LCD screen to show 3D data, it will be understood that any device permitting such visualization may be used.

System Overview

FIG. 1 schematically shows an individual preparing to use a computer workstation in accordance with various embodiments of the invention. The computer workstation 100 may include a general purpose computer having a 3D modeling graphical computer application installed thereon. While such a workstation generally requires a number of components to function, in the interest of brevity and clarity, only those components specifically relating to various embodiments of the present invention are shown and particularly described.

The workstation 100 may include a computer system 102, shown in the figure on the floor under a table 104. The computer system 102 has drives 110, 112 that can accept removable media such as floppy disks, memory sticks, compact disks, and DVDs. An individual, or "operator" 120, shown at the lower left, may insert removable media containing software instructions for a graphical computer software application into drive 110 or 112, and install the software according to methods well known in the art. The workstation 100 has a number of input devices, including a keyboard 130 and pointing device (e.g., a mouse 132 or graphics tablet). The workstation 100 also has a number of output devices, including one or more video displays 140, 142. Multiple displays may cooperate to show a single, virtual environment 150 in which several three-dimensional (3D) objects exist. In the figure, a single 3D pyramid 152 is shown on each of the two video displays, with the left display 140 showing pyramid 152 with its front face shaded, while the right display 142 shows the same pyramid 152 with its lower face shaded. Among other things, the graphical application may be configured to display the same 3D objects differently on different displays, or different objects on multiple displays as described more fully below in connection with FIG. 14.

FIG. 1 represents an exemplary embodiment of the invention only, and it will be understood that the invention may be embodied in other ways. For example, computer system 102 may be located remotely from the operator. Or, there may not be a dedicated computer system 102 at all—the graphical application may execute on a supercomputer, mainframe computer, hosted computer system, or other suitable computing device. Furthermore, while two displays are shown in the figure to help orient the description, it will be understood that different numbers of displays may be used in other embodiments of the invention. A particular embodiment may have one or more graphical displays.

Figure 2:
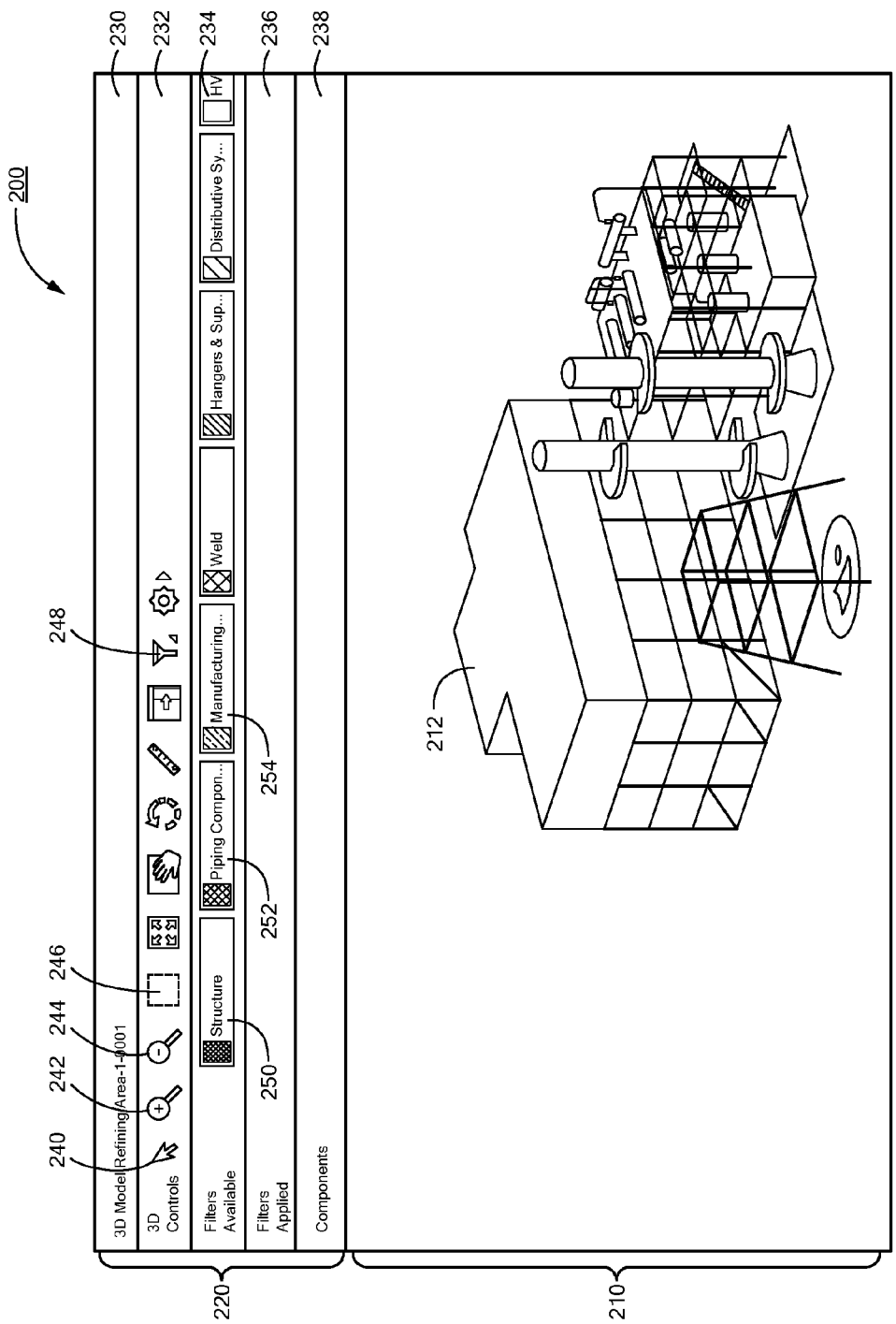
FIG. 2 depicts a video display, on which is displayed a graphical user interface in accordance with various embodiments.

FIG. 2 depicts a screen capture of a video display such as that of FIG. 1, on which a graphical application displays a graphical user interface (GUI) 200 in accordance with various embodiments of the invention. An operator (not shown) interacts with the GUI 200 to design and manipulate 3D objects. For the purposes of simplifying the disclosure, the GUI will be described as being displayed on a single video display, but it should be noted that a single GUI may be displayed on two or more video displays, as shown in FIG. 1.

The exemplary GUI 200 of FIG. 2 contains two areas that assist an operator in viewing and manipulating three-dimensional objects: an object display area 210 and an input area 220. A large portion of the bottom of the display includes a 3D model of an object 212. In FIG. 2, the object is a portion of an industrial building, but generally it may be any 3D object or collection of objects. The application displays a 3D object by performing a series of graphical computations on a collection, or dataset, of 3D model data (not shown). This dataset includes size, position, and orientation data for at least one, but typically large numbers of 3D objects. In addition to these data, each 3D object data includes information that serves to categorize it, as explained more fully below in connection with FIGS. 3-8.

The input area 220 of the display includes a title bar 230 and several "ribbons," or rectangular input areas 232, 234, 236, 238. The ribbons may be partially transparent, as shown, to allow the operator to see more of the displayed 3D objects. Four ribbons are shown in FIG. 2: 3D controls 232, Filters Available 234, Filters Applied 236, and Components 238. Other embodiments of the invention may have a greater or smaller number of ribbons, depending on the purpose to which the graphical application is put, or for other reasons. Ribbons may be fixed in their location on the screen, or they may be movable or dockable to provide the operator with greater flexibility in controlling the appearance of the graphical user interface. It will be understood that the term "ribbon" includes any input area that behaves as described herein, and is not limited to a rectangular shape. For example, a ribbon may be circular, ovular, polygonal, or irregularly-shaped.

The first ribbon 232 is labeled "3D controls." This ribbon 232 has a number of visual indicia for manipulating the 3D object shown in the large display area at the bottom of the display. Visual indicia shown in this ribbon provide mnemonic functionality, and are typically (but not necessarily) fixed in location within the ribbon. Indicia mnemonics are well known in the art, or can be inferred by an operator with little difficulty. For example, the arrow-shaped indicium 240 may signify an object selection tool, the magnifying glass visual indicia 242, 244 may signify a "zoom" function; the dashed box indicium 246 may signify an area selection tool, and so on. By selecting such an indicium with a workstation pointing device, an operator may apply the selected functionality to the displayed 3D object 212 or a portion thereof. The indicium 248 shaped like a filter represents a filtering operation that is particularly relevant to embodiments of this invention. Filters are described in more detail below in connection with FIGS. 3-8.

Figure 12A:
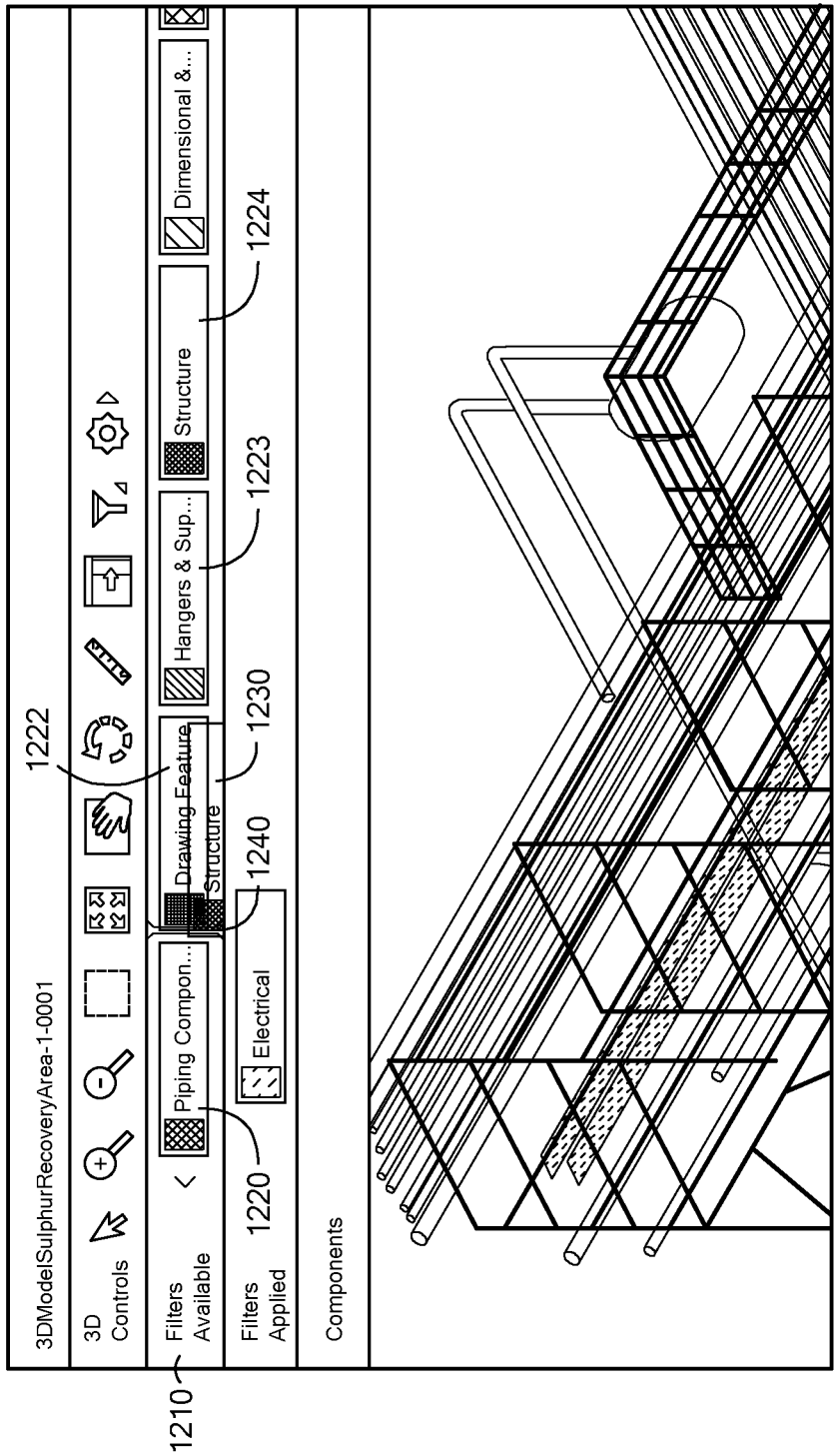
FIGS. 12A and 12B pictorially represent an example graphical user interface following the process of FIG. 11.
Figure 12B:
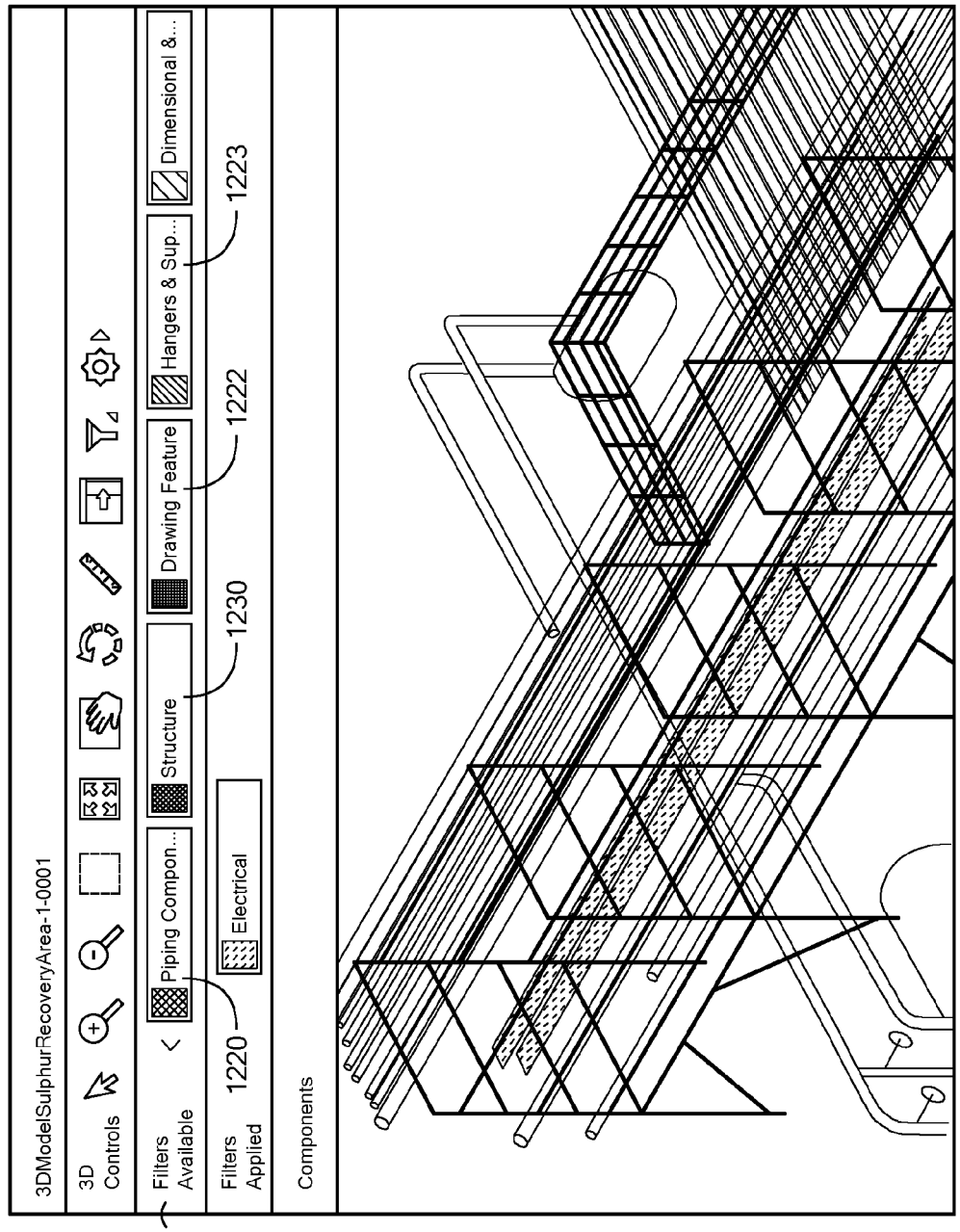

The second ribbon 234 is labeled "Filters Available." This ribbon has a number of visual indicia 250, 252, 254, and so on, each of which represents a particular data filter that the operator may select to display certain 3D objects. Each data filter is capable of selecting, from the dataset, a subset of 3D model data for further display and manipulation. There may be a large number of such indicia. The operator may rearrange the indicia within the ribbon for the operator's convenience, as shown in FIGS. 12A and 12B. Each indicium may be associated with a different color, as shown in the small, colored box within each indicium, to aid the operator in visualizing the 3D objects selected by the indicium's associated filter. The operator may modify the color of each visual indicium using a selection input such as that shown in FIG. 13C, or the operator may select each color from a collection of pre-defined colors.

The third ribbon 236 is labeled "Filters Applied." This ribbon 236 is capable of receiving and displaying filter indicia from the second ribbon. A filter indicium, such as Structure indicium 250, may be drag-and-dropped from the second ribbon 234 into the third ribbon 236 or vice versa, or may be transferred using other techniques, such as selecting a filter from a drop-down menu, or by double-clicking. Once a filter is applied, objects in the 3D object display area 210 may be redisplayed according to the data selected by the filter. For example, selected data may be displayed in a user-selectable color, while the non-selected data is displayed in a neutral color. The user-selectable color may be the color associated with the filter to provide the operator with a simple visual indication of which data was selected by the filter. Or, non-selected data may be hidden, darkened, or made translucent. Other display variations may be implemented without deviating from the scope of the disclosure.

The fourth ribbon 238 is labeled "Components." This ribbon 238 may list individual 3D objects (e.g., by name or tag number) that correspond to a particular applied filter. Thus, when an operator drags and drops a filter indicium from the second ribbon 234 into the third ribbon 236, then selects the indicium a second time (e.g., by single- or double-clicking it), the fourth ribbon 238 may populate with 3D object data pertaining to the twice selected filter. By further selecting some of these object data, the 3D object display may be further altered. For example, the 3D object corresponding to the selected object data may be displayed in a second user-selectable color, or it may flash to draw the operator's attention, or the display may depict a close-up view of the 3D object centered on the selected subobject. Again, variations on this theme are considered to be within the scope of the disclosure.

In order to provide the maximum available working space, not all ribbons need to be displayed on the video display at the same time. For example, the "3D controls" ribbon 232 has an indicium 248 shaped like a filter. In some embodiments, an operator clicks indicium 248 to alternately show or hide the other ribbons 234, 236, 238. Other mechanisms for showing and hiding ribbons 232, 234, 236, 238 are contemplated, including without limitation activating a control in a menu system, or activating a graphical control such as an expand/contract caret. For example, a ribbon may contain a "hide" caret to hide a ribbon, and a "show" caret to show a hidden ribbon. By pressing the "hide" caret, an operator may cause the application to display a transition graphic, such as a sliding line, that removes the ribbon from the display. By pressing the "show" caret, an operator may cause the application to display a sliding line that reveals the ribbon. Furthermore, an application may change a "hide" caret to a "show" caret after activation, e.g., by displaying a visual indication of the caret's function, such as pointing the caret upward for the hide function and pointing the caret downward for the show function.

Similarly, an operator may show or hide filter indicia within each ribbon by using menus or control buttons, such as carets. Additionally, an operator may rearrange filter indicia within a ribbon, for example as shown in FIGS. 12A and 12B in connection with drag-and-drop operations.

Filtering Attributive Data

An application in accordance with illustrative embodiments of the invention displays 3D objects based on 3D object data contained in a dataset. However, an operator may be confused by the display if all of the 3D objects are displayed at the same time in the same manner, as there may be hundreds, thousands, or even millions of individual data in the dataset. Thus, it is convenient for an operator to select only a portion of the data in the dataset for distinctive visual display, for example by highlighting in distinctive colors, or by hiding or masking non-selected objects. Such a selection is performed by data filters, in accordance with some embodiments of this invention. Thus, data filters select data from the dataset for display, based on their attributes.

Each datum in an application dataset has one or more attributes. FIG. 3 shows a representation of several such object data 310, 320, 330, along with an exemplary selection of tuples that they may possess. These data are each labeled by a unique designation: datum 310 is thus labeled "P101-014", datum 320 is labeled "P102-0146", and datum 330 is labeled "P104-018". The form of the label is defined by the operator or built into the graphical application, and may be a serial number or other unique identifier. Typically, a dataset will have hundreds, thousands, or millions of data, and the particular form of the data represented in FIG. 3 should not be interpreted to limit the scope of the invention.

Each datum in the dataset possesses a number of tuples, each having a named attribute and an associated value. In the exemplary FIG. 3, these are Class, Tag/name, Diameter, X1, X2, Y1, Y2, and Z1, Z2 spatial positions, and Ontology. Such tuples typically include any property related to the visualization of a three-dimensional object, building, structure, or system, such as spatial orientation, bounding box, render color, and coordinates. They may also include information relating to construction material(s), standards compliance information, manufacturer information, on-site delivery time, project installation phase, or the design, use, or construction of the physical objects they represent. To be more specific, referring to FIG. 3, datum 310 represents an 8" diameter pipe located at coordinates (X1=10, X2=15; Y1=20, Y2=25; Z1=30, Z2=35). Datum 320 represents a 4" diameter pipe at coordinates (X1=100, X2=110; Y1=120, Y2=130; Z1=140, Z2=150). Datum 330 represents a 2.5" diameter pipe at coordinates (X1=210, X2=230; Y1=220, Y2=240; Z1=230, Z2=250). The graphical application disclosed herein can display 3D objects having the characteristics of each of these data, with or without first applying data filters.

As described more fully below in connection with FIGS. 9-11, in some embodiments each individual datum models a single component of a three-dimensional physical manufacture. In order to display these data in a manner conducive to human manipulation, they may be organized conceptually and searched according to the concepts. By undertaking a conceptual organization according to some embodiments of this invention, millions of data may be searched efficiently through the use of filters, providing substantially faster searches than are currently available in the art of 3D computer modeling and design tools.

FIG. 4 graphically depicts the logical operation of a data filter acting on an exemplary dataset. The dataset 410 contains eight data, denoted here as A through H. Each datum has various attributes (not shown) as described above in connection with FIG. 3. A filter 420 acts upon the data in the dataset 410 by selecting data according to their attributes. For example, one filter may select all data that represent pipes, plates, beams, etc., or all data that intersect a given point, line, plane, box, or other location or shape. Further, an ontological filter, as described below, may select data based on their ontological attributes. As shown in FIG. 4, the filter 420 has been applied to dataset 410, thereby selecting a subset of data 430 that contains data A, C, and G. For example, filter 420 may have selected all data having X coordinate equal to 100 and Z coordinate equal to 25. This selected subset of data may now be displayed on a video display.

Figure 5B:
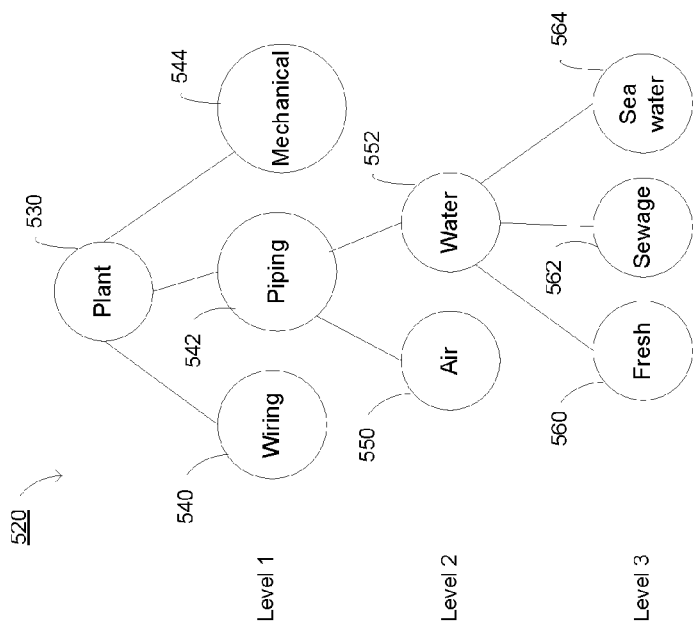
FIGS. 5A and 5B show various relationships that may be defined among data filters, and one possible organization of data filters into levels.
Figure 5A:
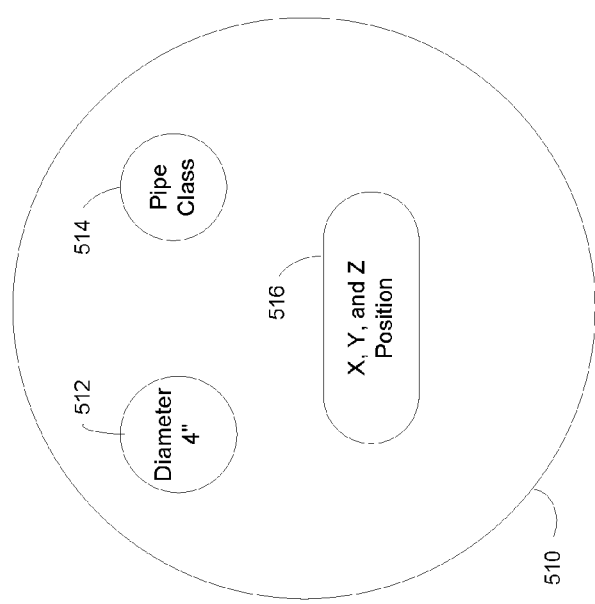

Typically, an operator will define and use a large number of filters, such as filter 420, in the course of interacting with the graphical application. These data filters may be organized in a number of different ways, two of which are shown in FIGS. 5A and 5B. The most generic organization of filters is as a flat set of filters 510, as shown in FIG. 5A. The exemplary set has three filters 512, 514, 516, labeled Diameter 4"; Pipe Class; and X, Y, and Z Position respectively. Organization of filters into sets is completely general, and does not necessarily imply any relationship between the filters.

It may be convenient, however, to define hierarchical relationships between data filters. One filter may select a strict subset of the data selected by another filter, no matter what the data are in the dataset. For example, a first filter may select all pipes, and a second filter may select all water pipes. In this example, all of the data selected by the second filter form a strict subset of the data selected by the first filter.

Filters may thus be organized in a tree, as shown in FIG. 5B, and it is convenient to use genealogical terms to describe them. Thus, one refers to a first filter as a "parent" filter and refers to a subset filter as a "child" filter. If a parent filter has many children, the children may be collectively referred to as "sibling filters." If a child filter has children, these are "grandchildren" of the child filter's parent, which is then a "grandparent." The collection of a filter's parents and their parents may be referred to as "ancestor" filters, and so on. For the purposes of this disclosure, hierarchical filters arranged in this way are endowed with a "level" property, which is analogous to a genealogical generation. Thus, a child filter has a level that is one greater than its parent. Sibling filters have the same level (although not all filters having a given level must be siblings). Grandchildren have a level that is two greater than their grandparents, and so on.

To be more specific, the exemplary tree 520 in FIG. 5B relates to filters appropriate for designing an industrial plant, although a person having ordinary skill in the art may find other filters appropriate for other purposes. The top level filter 530 of the tree (denoted "Plant") is at the top of the figure, and selects all components of the plant. To assist an operator in designing a plant, a graphical application may have broad filters for selecting, from the dataset, data representing e.g., wiring, piping, mechanical elements, and other components. These child filters, 540, 542, and 544 respectively, are shown as branches of the tree, and all have Level 1 as they emanate from the base of the tree. Within one of these filters, for example the piping filter 542, it may be convenient to distinguish different kinds of sub-filters. Thus, an operator may design a plant having pipes for carrying both air and water. Sub-filters 550, 552 for air and water, respectively, have Level 2 because they specialize Level 1 filters. Further, an operator may define several types of pipes for carrying water, depending on the type of water. An operator may require a certain kind or number of pipes to properly distribute fresh water throughout the plant, while sewage and sea water may be distributed differently. Thus, an operator may define Level 3 filters for these types of water pipes, as shown in FIG. 5B as filters 560, 562, and 564. The process of creating and organizing filters into levels this way may be extended to any level, or ad infinitum.

In accordance with some embodiments of the invention, an operator may create and organize filters according to any organizational structure, such as a set or a tree as a result of operator input into the graphical application. In other embodiments, an operator may define more complex and abstract relationships between filters. For example, an operator may instruct the graphical application that certain combinations of filters may be used together. Thus filters relating to the composition of an object and filters relating to structural components may be used in conjunction. The operator thereby defines a collection of direct product or Cartesian product filters, each of which selects all objects having both a particular structure and a particular composition. The product set of filters may contain, for example, a filter for iron rebar (i.e. a product of an iron filter and a rebar filter). Similarly, the product set may contain a filter for steel crossbeams, and a filter for wooden A-frames. Each such product filter is a child of two filters, one relating to material and one relating to structure. It will be understood that the invention scope is not limited by this example, and obvious variations on methods for organizing filters are contemplated.

Figure 6A:
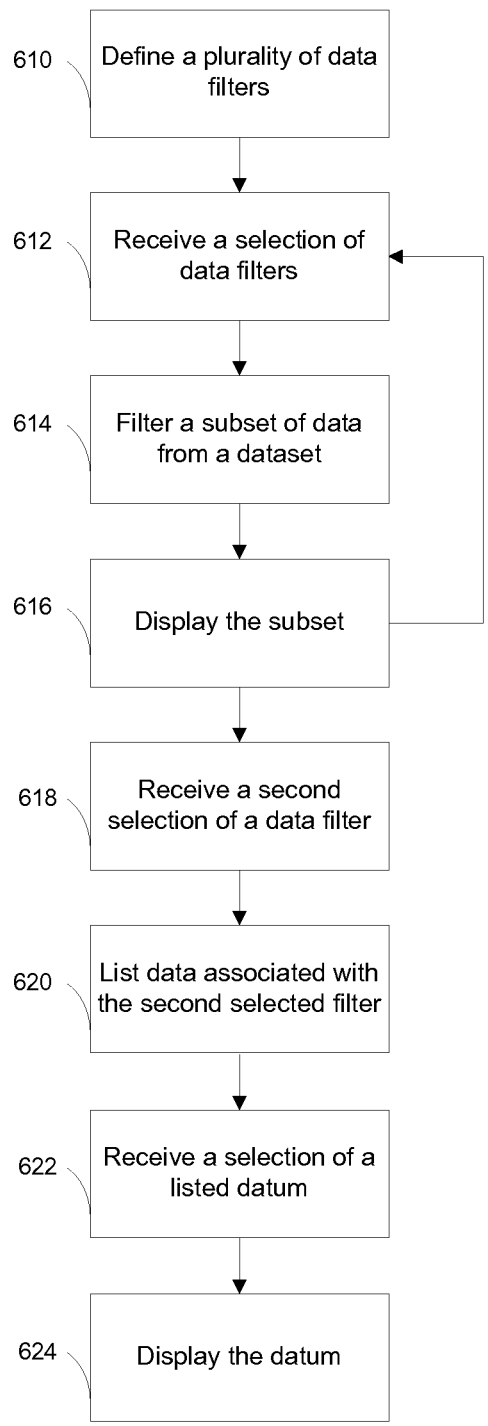
FIG. 6A shows one embodiment of a process for displaying, on a video display, data that have been filtered by one or more data filters.

FIG. 6A shows one embodiment of a process for displaying, on a video display, data that have been filtered by one or more data filters. The first step 610 in the process defines a plurality of data filters. This step 610 may include, in one embodiment, a graphical application soliciting input from an operator. In another embodiment, the graphical application may be pre-programmed with a plurality of data filters before it is distributed to operators. In other embodiments, the data filters may be updated by means of a computer network, portable storage medium, or other facility, with or without operator intervention.

An operator may define data filters in any number of ways. For example, the application may include text files or a database of data regarding filters that the operator can manually edit. The filters themselves have attributes and properties that lend themselves to recordation in a number of different formats, both human-readable and machine-readable, including without limitation XML and XML-based formats. The operator may edit information about the data filters using a menu provided by the application GUI, or by performing database (SQL) commands, or by opening a data filter file using a word processor or text processor.

Data filters may also be pre-programmed. For example, a version of the graphical application specially tailored for the design of certain classes of three-dimensional structures may be produced, with filters for many of the different types of attributes that might be found in components of those structures. Such filters may include those for selecting types of building materials, or construction dates, or functions fulfilled by each component. These data filters may be periodically or sporadically updated by the company that purveys the graphical application, by way of a software update. Such software update could be delivered by, for example, a computer data network, a tangible, computer-readable storage medium, or by other means. Operator intervention may be required to perform an update, or the update may occur automatically at set intervals or according to any other schedule.

The next step 612 in the process of FIG. 6A is receiving a first selection of data filters. Typically, the graphical application displays a 3D object or collection of objects, and some or all of the plurality of data filters, on a video display, as described in connection with FIG. 2. These data filters may pertain to the physical attributes of the 3D objects, or they may pertain to the ontological characteristics of the objects (as described in more detail below), or both. As described below in connection with FIG. 9, the application may screen out some of the list of available data filters based on a pre-selection. The operator of the graphical application then selects one or more data filters in order to choose a subset of 3D object data for distinctive display. The operator may choose individual filters and perform a drag-and-drop operation on each, as described below in connection with FIGS. 11 and 12. Any other method known in the art for receiving a selection from an operator may be used.

The next step 614 in the process filters the subset of data corresponding to the first selection from the dataset. The application may filter the dataset by any known means including, without limitation, performing one or more database queries. Filtering may also be done by searching a text file, or by searching data structures stored in the memory of the workstation on which the graphical application is running. Once the subset of data has been filtered, the next step 616 displays the subset on one or more video displays in a distinctive manner. Some of the different ways in which the application may perform this step in various embodiments of the invention are discussed below in connection with FIG. 13A. At this point, the application may display additional data filter indicia to allow the operator to select additional data for display. This action is indicated by the arrow between step 616 and step 612.

It may be advantageous to perform sub-filtering of the subset of data that is distinctively displayed. For example, an operator may be interested in locating and highlighting a particular pipe, or weld, or electrical panel. Thus, in some embodiments, the operator may make a further selection of one the first selected data filters, so as to cause the GUI to display a list of sub-filters, or a list of 3D object data that correspond to the twice-selected filter. The process of FIG. 6A may therefore be continued in the next step 618 by the graphical application receiving a second selection of a data filter.

Figure 6B:
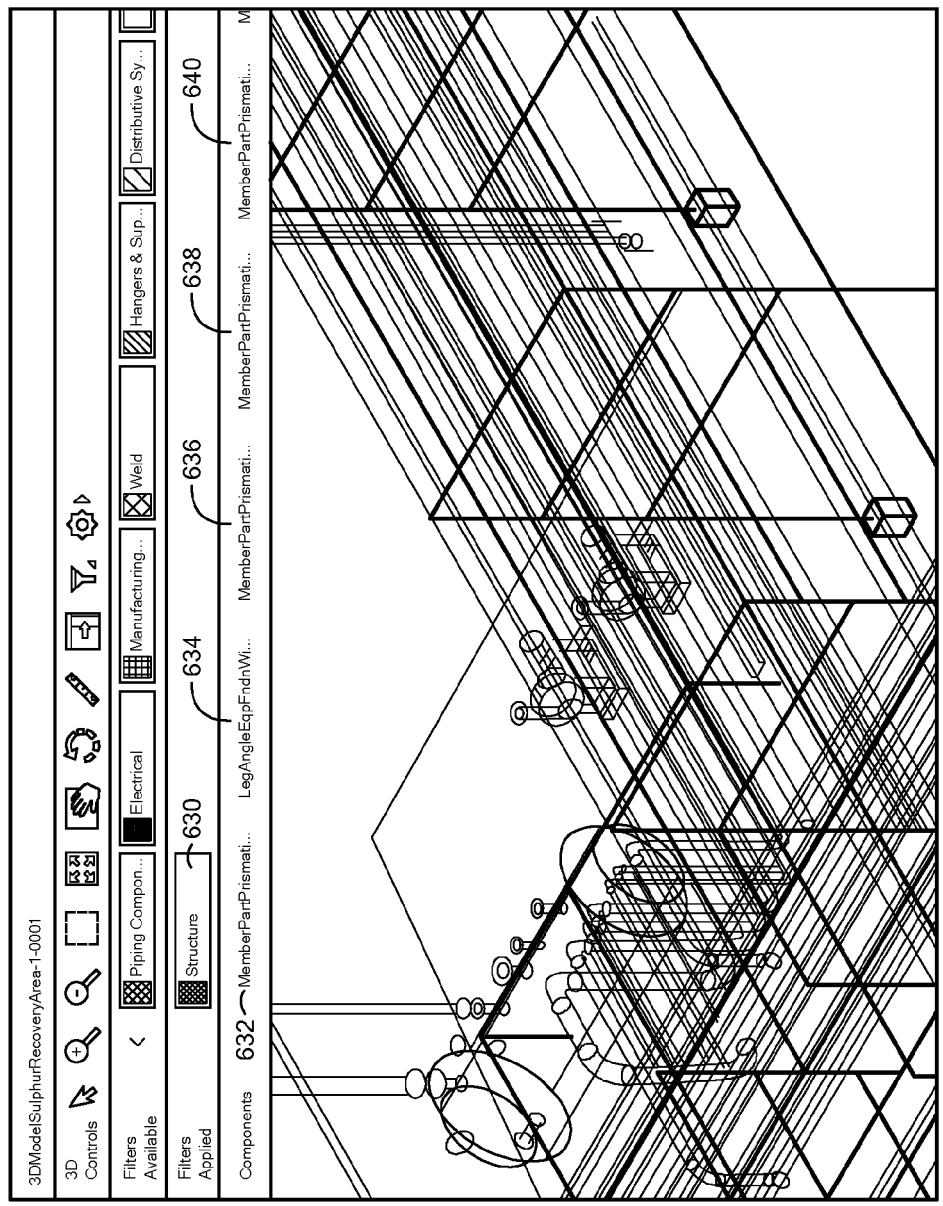
FIGS. 6B and 6C pictorially represent an example graphical user interface showing a video display after certain steps in the process of FIG. 6A.

In step 620 of the process, the application lists data associated with the second selected filter, including the list of 3D object data. FIG. 6B shows an example graphical user interface after step 618. In this figure, an operator has selected a "Structure" filter indicium 630 for a second time in step 618, so that the graphical application has displayed a list of structural components 632, 634, 636, 638, 640 selected by this filter in the "Components" ribbon. The application shows the visual indicium 630 with a different background color than the non-selected indicia, to draw the attention of the operator to the fact that the indicium was selected for a second time. However, none of the drawn components in the component area of the screen are highlighted, as the operator has not selected any of them yet.

Returning to FIG. 6A, in step 622 of the process, the application receives an operator selection of a visual indicium for a particular one of the listed data. The selected indicium may be displayed in a user-selectable color to draw the attention of the operator to the fact that the indicium was selected. In step 624, the graphical application displays a representation of the object represented by that particular 3D datum on the video display. The datum selected for display may be shown in an exploded view, a cross-sectional view, or an enlarged view.

Figure 6C:
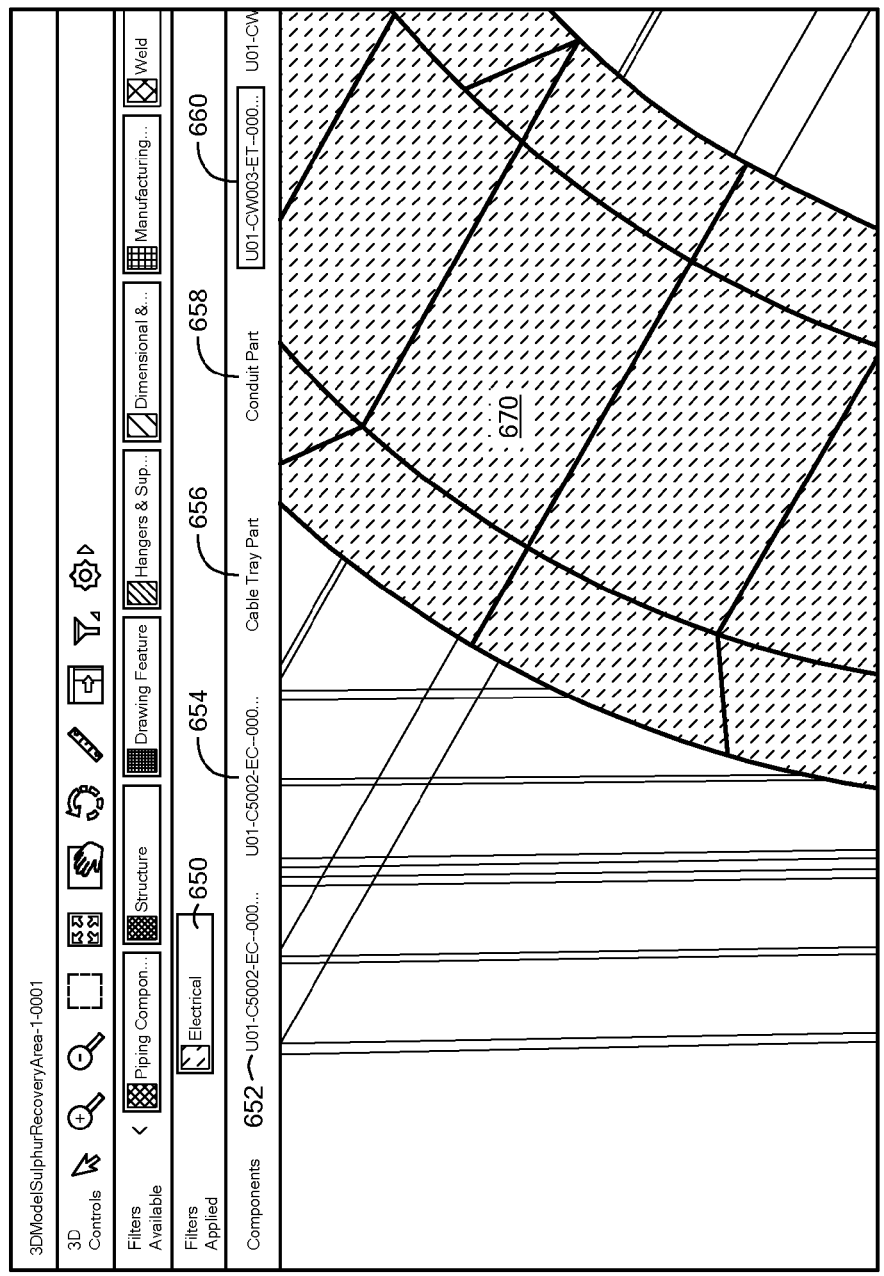

FIG. 6C shows a different example graphical user interface after step 624. In this figure, the operator has selected an "Electrical" filter indicium 650 for a second time, so that the graphical application has displayed a list of electrical components 652, 654, 656, 658, 660 in the "Components" ribbon. While this particular filter indicium relates to an ontological characteristic of these components, such filters may also pertain to physical attributes of the components. In step 622 the operator has selected the visual indicium 660 for the component U01-CW003-ET-000. In step 624 the application displayed the component data as an enlarged 3D object 670 that has been shaded in the user-selectable color that corresponds to the selected "Electrical" filter. In the embodiment of FIG. 6C, the application displays the non-selected data in the dataset on the video display as 3D objects in a non-distinctive, wireframe manner.

An operator may wish to combine filters not just of different levels, such as "pipes" and "water pipes," but to filters of the same level, such as "pipes" and "wires." For example, an individual designing an industrial plant may wish to run insulated wiring along pipes, and may want to see on the video display a representation of which pipes in a design are currently supporting a run of wires, and which are not. However, the question arises, how to combine the subsets of the dataset selected by two or more different filters. Some of the subsets of filtered data may overlap, and there are several logical (Boolean) functions that may be applied to these subsets to determine a final set of data for display.

Figure 7A:
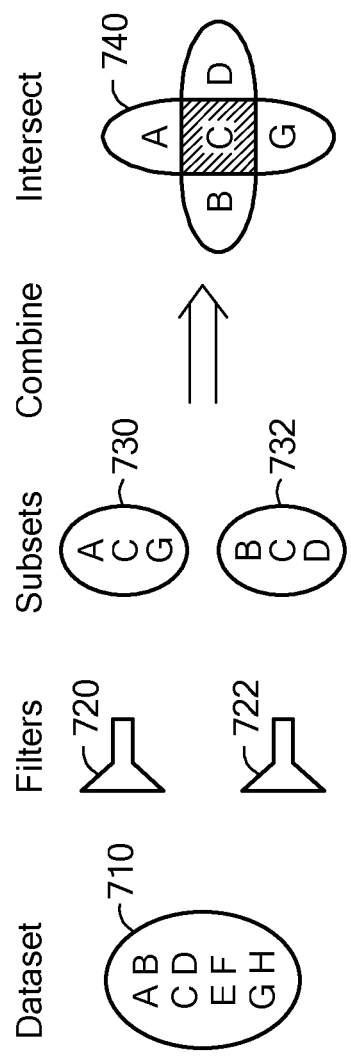
FIGS. 7A and 7B show the logical operation of alternative embodiments, in which data simultaneously filtered from a dataset by several filters may be combined for display differently.
Figure 7B:
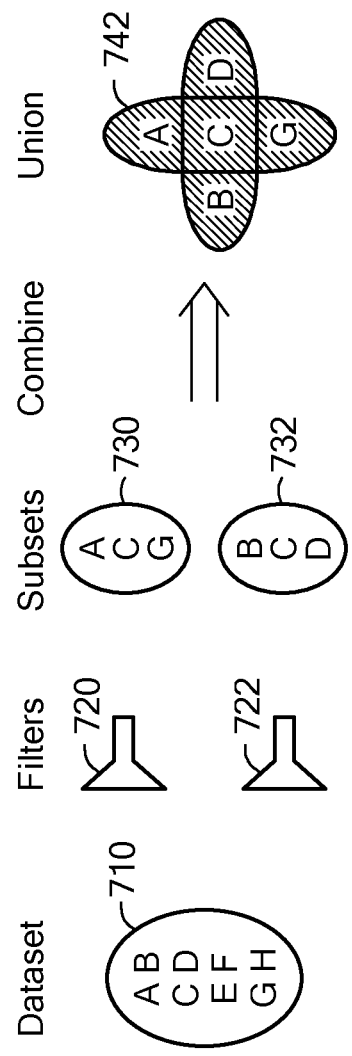

FIGS. 7A and 7B show the logical operation of some embodiments, in which data simultaneously filtered from a dataset by several filters are combined for display. In particular, FIG. 7A shows a process where an intersection of the datasets (logical AND) is selected for distinctive display, while FIG. 7B shows a process for selecting a union of the datasets (logical OR). Other logical functions (e.g., exclusive-or, and other Boolean functions taking any number of arguments) may be applied to the datasets to select data for display.

The dataset 710 and first filter 720 in FIGS. 7A and 7B are identical to those in FIG. 4. In particular, the dataset 710 includes eight data, labeled A through H, and the first filter 720 selects data A, C, and G in a first subset 730. The second filter 722 in these figures selects data B, C, and D in a second subset 732. These subsets are then combined as now described. In FIG. 7A, the filter selects only those data that appear in each (or where more than two subfilters are used, all) of the subsets. In this example, only datum C appears in both subsets 730, 732 (as indicated by the shading in the combined set 740), and the filter selects only datum C for distinctive display. The application may perform this selection by, e.g., comparing the contents of the two selected subsets element by element, and constructing a third subset for display that contains the elements contained in both subsets.

By contrast, in the embodiment represented by the process illustrated in FIG. 7B, the graphical application distinctively displays all of the data in both (or more generally, all) of the filtered subsets. In this case, the combined set 742 includes data A, B, C, D, and G, as indicated by the shading. In both of the embodiments shown in FIGS. 7A and 7B, the non-selected data in the dataset may be displayed in a non-distinctive fashion, or according to any of the methods described below in connection with FIG. 13A. In FIG. 7A, the non-selected data are data A, B, D, E, F, G, and H. In FIG. 7B, the non-selected data are data E, F, and H. As before, the data selected for display may be shown in an exploded view, a cross-sectional view, or an enlarged view.

In various embodiments of the invention, an operator chooses which logical function (AND, OR, etc.) applies to the datasets to form the final collection of data for distinctive display. For example, the operator may select a function from a list of functions in a menu, drop-down display, using a drag-and-drop operation, by editing text in a configuration file, or by any other method known in the art.

The techniques for combining data subsets just described are applicable regardless whether the subsets are selected by filters on the same level or on different levels. For example, an operator may select a first level filter for "pipes", and a second level filter for "water pipes." The operator may then select a second, first level filter for "wiring." In this case, the graphical application can combine the first level filter "wiring" with the second level filter "water pipes" to obtain a set of wiring data that follows water pipes specifically, as opposed to wiring that follows other forms of piping. A person having ordinary skill in the art should appreciate how to apply this functionality to other combinations of filters, of whatever level (or no level).

Figure 8A:
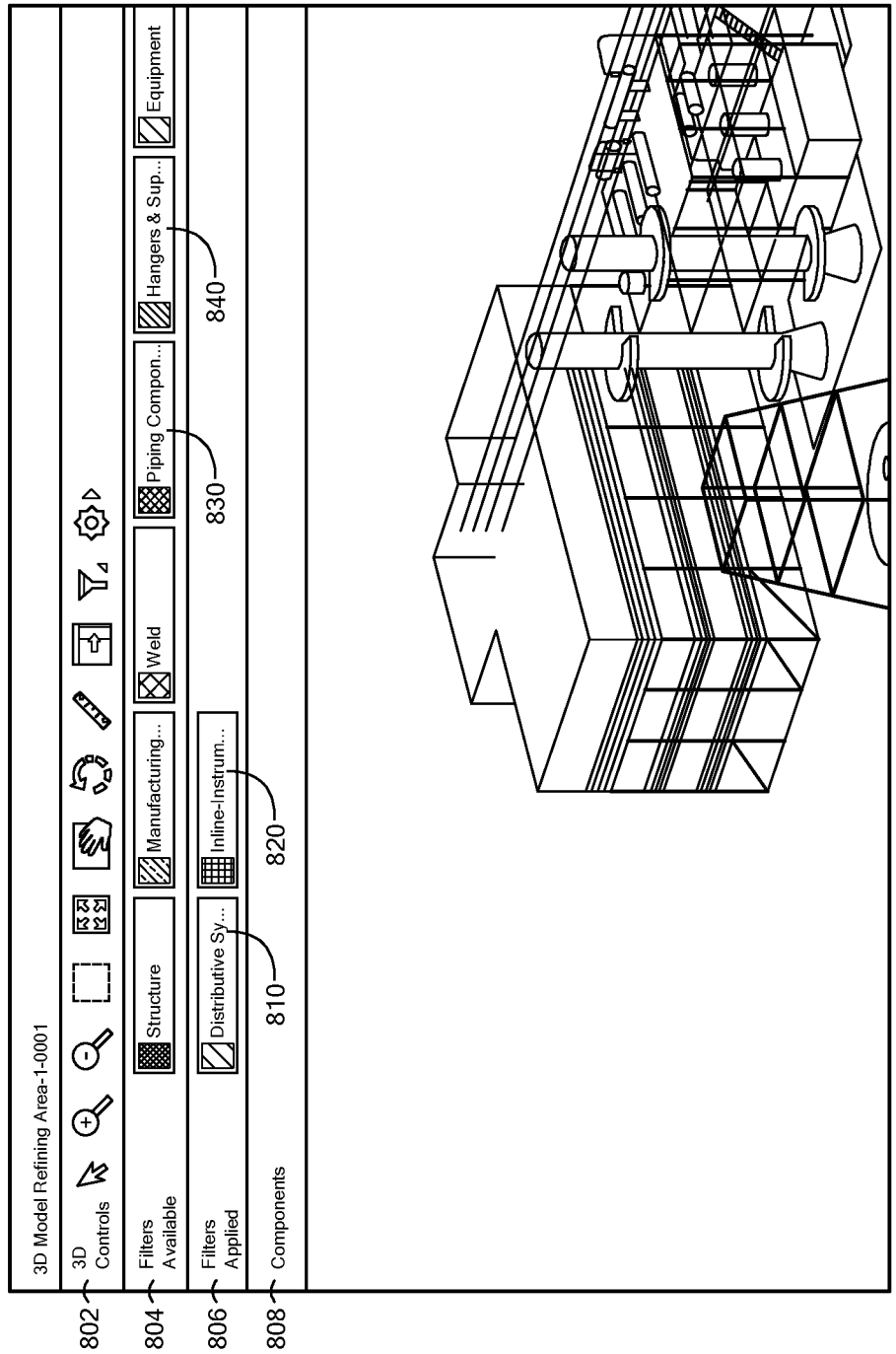
FIGS. 8A and 8B pictorially represent an example graphical user interface showing 3D model data simultaneously filtered from a dataset using more than one filter.
Figure 8B:
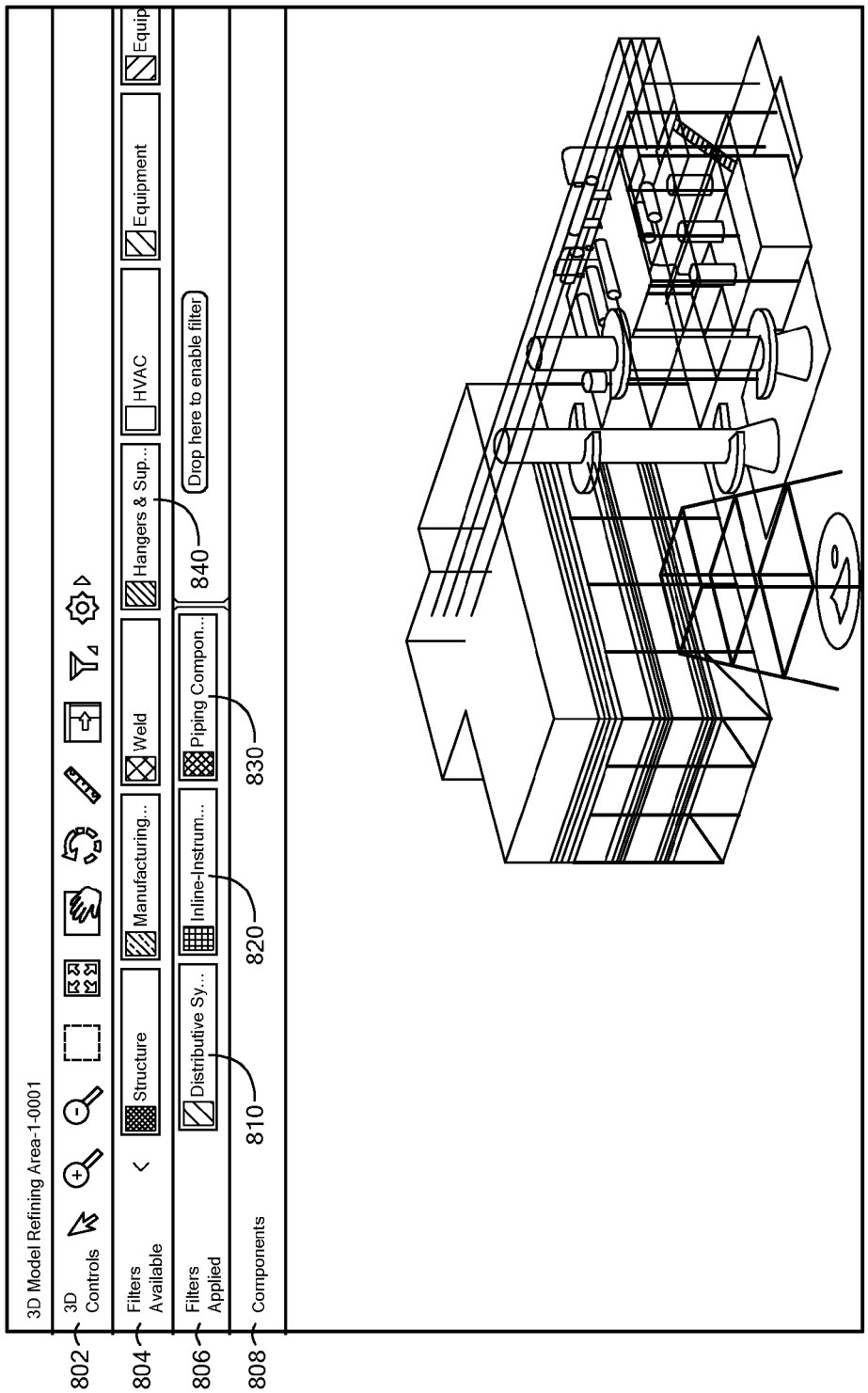

FIGS. 8A and 8B pictorially represent an example graphical user interface showing 3D model data simultaneously filtered from a dataset using more than one filter. The GUI shows four ribbons 802, 804, 806, 808, similar to FIG. 2. Two filters have been applied, the "Distributive Systems" and "Inline-Instrumentation" filters having indicia 810, 820 respectively. Each filter has a distinctive color, as indicated by the colored square within the indicium representing it. The union of the data in the dataset selected by these filters is shown in the 3D object display area of the screen in distinctive coloring, while the non-selected data are shown in wireframe. Other filters are available, such as "Piping Components" and "Hangers & Supports", having visual indicia 830 and 840, respectively.

In FIG. 8B, the additional filter "Piping Components" has been applied, by moving visual indicium 830 from ribbon 804 to ribbon 806. As described elsewhere, this transfer may be accomplished by double clicks, drag-and-drop operations, selections from a pull-down menu, or by other means known in the art. The graphical application shows the piping components in the distinctive color associated with this filter's indicium 830, in addition to the 3D objects selected for display by applying the other two filters. In addition, the operator has selected indicium 840, and is preparing to drag and drop it onto ribbon 806. This is shown by the yellow insertion cursor to the right of indicium 830, and the box labeled "Drop here to enable filter."

Filtering Ontological Data

The above discussion relates to the attributive filtering of data. In accordance with various embodiments of the invention, a graphical application may also (or alternately) provide filters that select data based on an ontology, as that term has been defined herein. For the purposes of this disclosure, such filters are called ontological filters. Some embodiments allow an operator to search or filter, not just by the properties of the data, but by ontological classifications, using these ontological filters. By providing ontological filters, the quantity of data that may require secondary searching, by its attributes, is greatly reduced. In the context of a graphical application backed by millions of objects, such a reduction is beneficial in terms both of computational power and an operator's perceived rendering delay. Furthermore, an operator may refine the ontology by adding meanings to the data that reflect her mental model. Over time, the application functions more and more in accordance with the operator's mental organization, giving the application a more natural and intuitive "feel."

Figure 9:
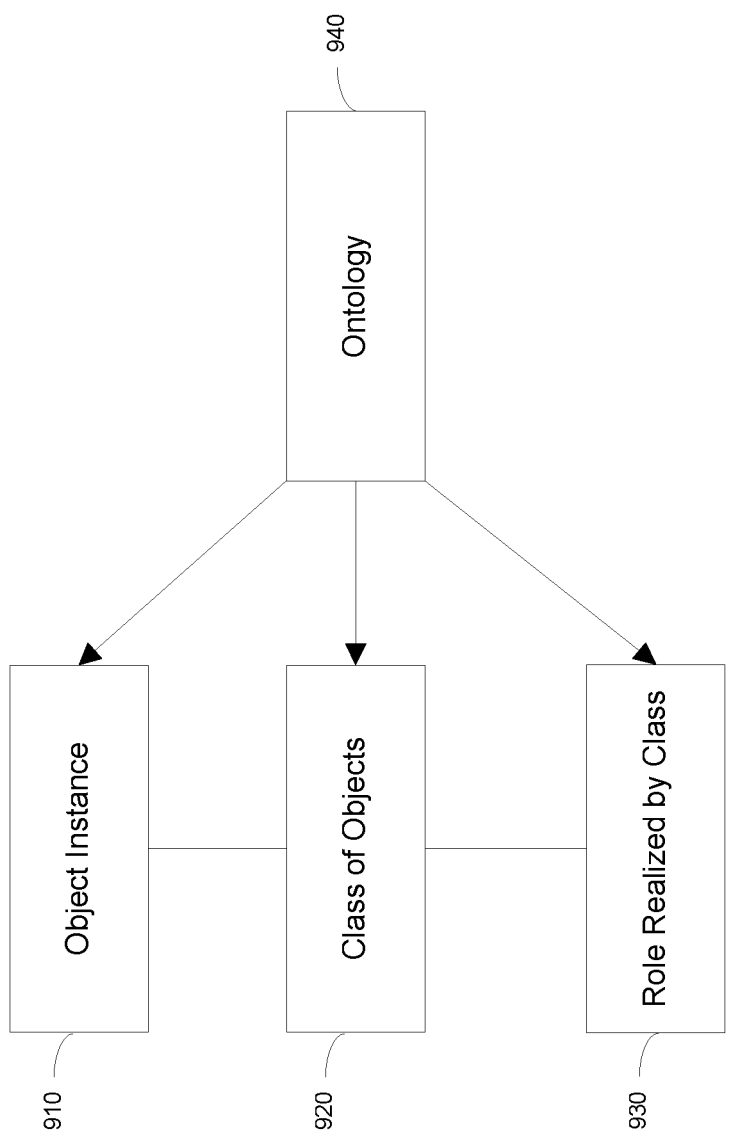
FIG. 9 schematically shows a relationship between different concepts, including instance, class, role, and ontology.

FIG. 9 schematically shows a relationship between different concepts, including instance, class, role, and ontology. At the most basic level, a graphical software application in accordance with various embodiments of this invention displays a collection of three-dimensional objects. Each object may be considered, at first, to exist independently of any other object. In order to display the object on a video display, the graphical application may use certain data, including the object's position, shape, spatial orientation, and display color. Examples of some of these data are shown in FIG. 3.

Conceptually, however, it is more beneficial for a human operator interacting with the application to treat certain groups of objects together. One logical method for doing so is to categorize like objects into classes of objects 920, whereby individual objects within a class are referred to as instances 910. For example, an operator may refer to the class of "all pipes" instead of object "instances P101-014, P102-0146, P104-018 . . . " Referring again to FIG. 3, for example, datum 310 represents an 8" pipe; datum 320 represents a 4" pipe; datum 330 represents a 2.5" pipe, all in the class of pipes. However the ontological classifications of the 3 pipes are quite different: datum 310 is a "heat riser," datum 320 is a "fuel line," and datum 330 is a "fresh water" pipe. These exemplary data values show that sometimes the classification of "pipe" is not as important to the operator as the ontological classification of the purpose of the pipe.

Object instances may be stored within a database accessible to a graphical application. On a project of sufficient scope and complexity, the number of instances of 3D objects stored in the database may be very large, perhaps numbering into the millions. As a result, searching these data may be very computationally expensive.

Nevertheless, even at the level of classes 920 and instances 910, an operator may already usefully interact with a graphical application. One may devise data filters that select, from the set of data, all data that represent instances of objects within a particular class. Thus, an operator may command the application to display or highlight all pipes, or all wires, and thereby obtain useful visual information. So long as the number of instances in a particular class is not very large, the application may render them without unacceptable delay.

Some embodiments of this invention extend the organization of data to another level by defining roles. A role 930 is a collection of properties that may be shared by several classes 920. One may notice that several classes 920 share similar functional features. For example, during the construction phase of a chemical process plant, the steel beam, concrete pier, and rebar object classes all serve well-defined structural roles. Chemical reaction vessels, pipes, valves, and vacuum and gas systems may all support a chemical process function. Each role or type of function has certain properties that are the same, regardless of the class. For example, each structural member supports a structure that is composed of a collection of other objects. Each structural member must support a certain amount of weight under certain conditions, and so on. Conversely, any object (of whatever class) that can perform these functions may be considered a structural member and fulfill a structural role. Thus, beams, piers, and rebar each realize a structural role, and vessels, pipes, and valves realize a chemical process role.

A class 920 may realize several roles 930. The class of chemical vessels, for example, may serve both structural and chemical roles. The class of valves may serve both chemical and safety roles. The class of electrical wires may serve power distribution, safety, and instrumentation roles, and so on. Conversely, as already shown, the same role 930 may be realized by several classes 920. The assignment of roles 930 to classes 920 may be done within the application by its programmers, if the application is tailored to a particular type of design project. Or, the assignment of roles 930 to classes 920 may be done by an operator at a later time.

The level of abstraction provided by defining roles yields further valuable information to a human operator interacting with a graphical application. An application may provide filters (as described above) based on roles 930, as well as filters based on classes 920. Thus, with role filters, an operator may direct the application to display all of the object instances 910 that fulfill a particular role, for example all structural elements. When activated, this filter selects all instances of beams, piers, and rebar. As described below, the operator may associate other object classes with this role. In one embodiment, once a role filter is selected, the application displays second-level filters for the classes associated with this role, using a second ribbon. An operator may then select a particular class filter, directing the application to display all instances of that class. In this way, an operator may marshal objects for display according to their functional role or roles within a design, increasing the application's ease of use.

It is convenient in some circumstances to associate a role with a class itself, rather than with individual instances. By doing so, an embodiment of the invention realizes additional efficiencies. For example, when an operator adds a new instance to a design, that instance (being a member of an associated class) automatically assumes each of the roles realized by its class. To be more concrete, when a chemical process plant designer adds a steel beam to the design of a plant, that steel beam automatically realizes the role of structural member (and any other roles realized by all steel beams), without requiring additional work on the part of the operator. Thus, the new beam will appear in a search for structural members, despite the fact that its instance datum contains no information about this role, and despite the fact that the operator did not explicitly specify that this new beam is structural. This result occurs because the connections between the instance and its roles, as meta-data, are accessed outside of the ordinary database search path. Typically, the number of these meta-data connections is much less than the number of data elements in the database. Thus, searches performed on the meta-data typically realize substantial gains in speed and computing efficiency over pure database searches alone.

Some embodiments of this invention take advantage of the efficiency gains provided by meta-data searching, to define an ontology 940. An ontology provides a mechanism for an operator to define useful information about object instances 910, object classes 920, and object roles 930. These meanings are not necessarily known to the graphical application software developer because they are specific to individual projects. For example, the designs of chemical process plants may differ depending on the particulars of the chemical reactions involved. Different materials may be required in the construction of process vessels, depending on the chemicals that will be reacting within. Different gas, heating, and cooling systems may be needed, and so on. Various embodiments of this invention allow an operator to give project-specific meanings to instances 910, classes 920, and roles 930 in an ontology 940, thereby tailoring a general graphical software application to the particulars of a design in a manner that mirrors the operator's mental model of the design. In this way, an application that is initially generically configured will, over time, advantageously conform to the operator's own idiosyncrasies, and may even come to feel "intuitive" to the operator.

An ontology includes meanings, which may be embodied as, e.g., tags, that an operator associates with one or more instances 910, classes 920, and roles 930. Similarly, any given instance 910, class 920, or role 930 may be tagged with any number of meanings in the ontology 940. Any object instance may have a number of different meanings, and any meaning may apply to a number of different instances. The relationships so defined are thus many-to-many. Similarly, the relationships between classes and the ontology, and between roles and the ontology, are also many-to-many.

Once an operator has defined ontology 940, a graphical application may define ontological filters that permit the operator to search a design project's instance data, and its meta-data (i.e., its classes and roles), based on the assigned meanings in the ontology 940. In combination with attributive class filters and role filters, ontological filters allow the application to present an intuitive interface that mimics the operator's mental model of a design project.

For example, it may be important for an operator to mark certain classes of objects, e.g., "heat risers," as being a poor choice to have near pipes that are identified as "fuel lines." In accordance with embodiments of this invention, an operator can associate an ontological tag that identifies a pipe as a "fuel line" and associate another tag with pipes that have been identified as "heat risers." Of course the 3D coordinates of the "heat riser" and "fuel line" are critical in deciding whether items are within a certain envelope, which might be critical to design rules, e.g., that prohibit heat risers from being within 6 feet of a fuel line.

By providing an ontology and then creating and applying ontological filters to various instances, classes, and roles, the operator forms a set of relationships between the data and meta-data that has useful emergent properties. For example, an operator may select an ontological filter that identifies instances of, e.g., "heat sources." In addition to displaying a list of heat sources, the application may study the list and determine that most of the heat sources are actually reaction vessels, an operator-defined role. Thus, the application may display, in addition to the heat sources and without further input from the operator, a list of all reaction vessels (including those that are not heat sources). Because these additional reaction vessels have a role that substantially overlaps with a role satisfied by the requested instances, their inclusion in a ribbon or menu may appear to the operator to be natural, or even predictive of the operator's next input. Thus, an embodiment of the invention may appear to an operator as if it has learned the operator's mental model of a design project, or the operator's design techniques.

As with classes 920 and roles 930, each instance 910 may inherit the ontological meanings associated with each of the roles realized by its class. In particular, instances may inherit meanings based on a change to their meta-data, and not to their graphical visualization data or their class data. A graphical application can determine all such inherited relationships for any particular operator query, using methods well known in the art for querying a database for the classes, roles, and ontologies (i.e., the meta-data).

A graphical application embodiment of the invention as just described provides a very rapid method for isolating a desired 3D object from amongst potentially millions of such objects, as follows. First, the application accepts an input search query based on the established ontology. Because the operator may define large numbers of specific ontological meanings, and may tag many classes (or even instances) with such specific meanings, the number of data elements (i.e., instances) associated with any given meaning may be very small. Then, a highly optimized query against the associated graphical data may be performed. In other words, the application breaks the operator query into a meta-data query (which operates on a relatively small data set) and an optimized data query (that applies to only the small portion of the data that have been pre-selected by the meta-data query). By dividing the query into these two sub-queries, the overall time required to respond to the input query can be greatly decreased.

A computer program that embodies the invention as described may be delivered from the program product manufacturer in a variety of states. Typically, individual instances 910 of objects are defined by an operator. To provide a useful platform from which to develop complex three-dimensional designs, the computer program may be manufactured with a collection of pre-defined classes 920, roles 930, or both. For example, a product for designing a chemical process plant may include within it a class 920 that represents process vessels having industrially common shapes whose dimensions an operator may configure to fit a particular design. Similarly, having pre-defined several common classes that represent structural components, the product may pre-define a role that links these classes based on the structural role that they all realize. The operator then uses these built-in classes and roles to instantiate objects that suit her particular design needs, and assign meanings to these objects.

An application may embody instances 910, classes 920, roles 930, and ontologies 940 in several ways. Instance data may be stored in a database, while class, role, and ontology meta-data may be stored separately in the database, in another database, in a text file editable directly by the operator or through the application interface, or in another suitable location. In some embodiments, these data are directly editable from within the graphical application itself. Obvious variations on these embodiments are contemplated.

Figure 10:
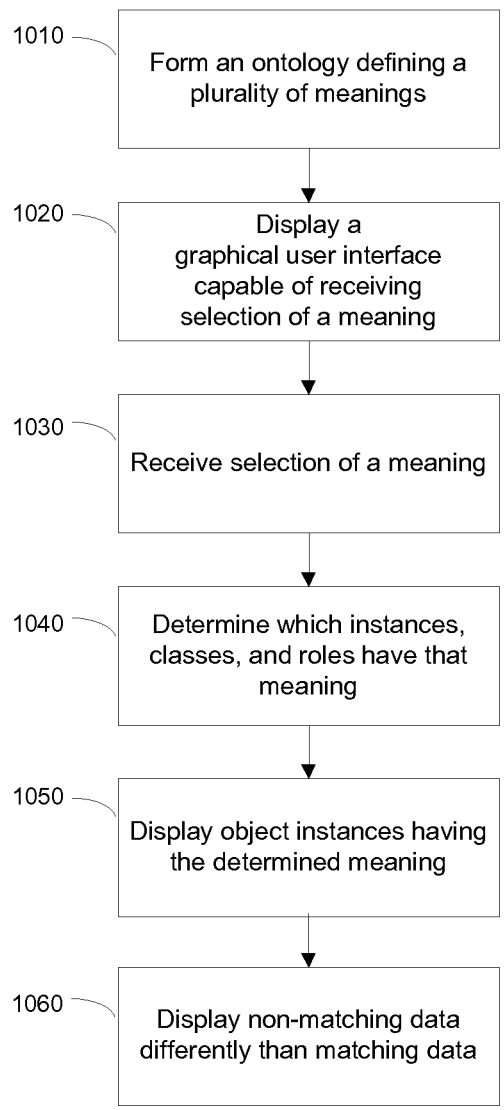
FIG. 10 shows one embodiment of a process for filtering data according to an ontological filter.

FIG. 10 shows one embodiment of a process for filtering data in a dataset according to an ontological filter. The first step 1010 of this process forms an ontology for association with the defined instances, classes, and roles. For example, the ontology could include a plurality of meanings that relate a class to another class sharing a role. Further meanings could relate instances whose data values belong to a particular range (e.g., all water pipes on a particular floor of a process plant). Still other meanings could define data selected from a particular set (e.g., all red and blue wires, but not green wires). An embodiment of the invention may form any type or number of meanings in an ontology.

In step 1020, the graphical application displays a GUI on a video display. The GUI may be similar, for example, to that shown in FIG. 2. The application is configured to receive a selection of a meaning in the ontology from an operator using the GUI. For example, the list of meanings may be displayed as part of an input area 234 in the GUI, or in a drop-down menu, or using other suitable input means.

In step 1030, the application receives the selection of a particular meaning. Typically, an operator will select a visual indicium, such as icon 250, which represents a meaning. The operator may, for example, drag-and-drop the indicium from one ribbon to another, as described above, or double-click the indicium to indicate a selection.

In step 1040, the application determines which instances (and/or classes and roles) have the selected meaning. This determination may be performed using any method known in the art, including a search of a database containing the associations between the ontology and the instances, classes, and roles, as shown in FIG. 9. In step 1050, the graphical application displays object instances matching the selected meaning. To further improve the functionality of ontological filtering, in the last step 1060 of the process, the application shows non-related objects on the video display differently than related objects. Several different types of display methods are discussed below in connection with FIG. 13A.

The application may or may not display a marking distinguishing a particular visual indicium as representative of an ontological filter or an attributive filter. Thus, the application may display both kinds of filter simultaneously in a uniform and attractive video display. Additionally, the two types of filters may be advantageously mixed in use. For example, a first, attributive filter may select all the pipes. After the operator selects a given pipe, a second, ontological filter may select all the pipes that carry oxygen using an operator-defined "oxygen" tag. In this way, the operator may obtain a great deal of detailed information in a simple and rapid manner.

If several ontological meanings are selected, the graphical application may display any or all objects whose data are related to other data in the ontology according to the selected categories. In particular, an operator may combine two ontological filters to form a useful composite filter. For example, an operator may combine an "oxygen" ontological filter with a "reaction vessel" filter to select for display all reaction vessels that use oxygen in their chemical reactions. In this way, an operator can further attune the graphical application to her own mental model. A person having ordinary skill in the art may appreciate other combinations of attributive and ontological filters that fall within the scope of the invention, as well as different methodologies for applying them.

User Interface Features

Some embodiments of the invention provide simple video displays that allow an operator to conveniently locate, manipulate, and apply filters. This permits an operator to easily and rapidly focus on a particular 3D object, and to simplify the use of the application. In particular, drag-and-drop operations provide a convenient method for transferring filters from one ribbon to another. Once the filter(s) are selected, a graphical application may present an operator with user-customizable display options that allow the data that have been filtered to be displayed in a distinctive and easy-to-understand fashion. Further, if an operator wishes to apply multiple sets of filters simultaneously, various embodiments of the invention allow the operator to use several video displays to simultaneously view 3D objects that exist in the same "virtual" environment according to different visual parameters.

Figure 11:
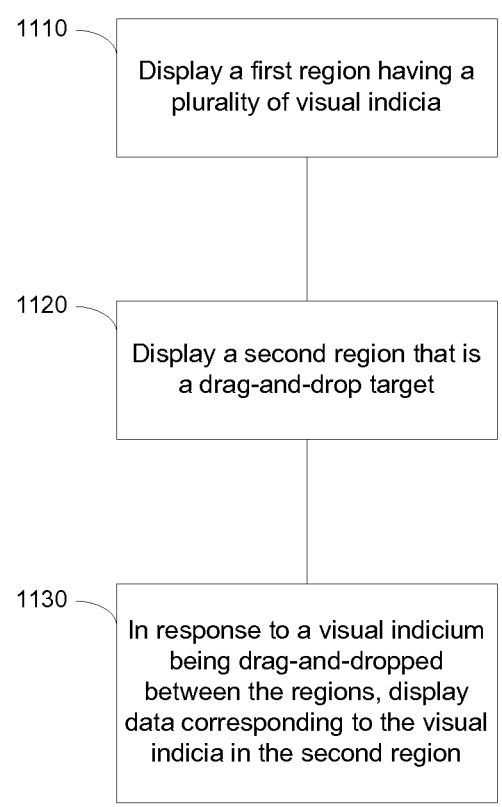
FIG. 11 shows one embodiment of a process for selecting data filters in a graphical user interface in accordance with a drag-and-drop embodiment of the invention.

FIG. 11 shows one embodiment of a process for selecting data filters in a graphical user interface in accordance with a drag-and-drop embodiment of the invention. In the first step 1110 of the process, an application displays a first region having a plurality of visual indicia that correspond to the ontology, or to properties of the data. The first region acts as a holding area for filters that have not yet been applied, but are available to apply. The attribute for any particular filter may be color, location, category, building material, or any other attribute. The first region may be a ribbon, or some other input area.

In step 1120, the application displays a second region on the video display. The second region acts as a holding area for filters that have been applied. As described above in connection with FIG. 2, an operator can select a filter to apply by moving to the second region. Again, the second region may be any kind of input area, including a ribbon.

In step 1130, the application receives notice that a drag-and-drop operation has occurred between the regions. For example, the operator may have dragged a visual indicium from the first region and dropped it in the second region, or vice versa. In any event, when the application receives notice of the drag-and-drop operation, it may infer that the composition of the list of applied filters has changed, and therefore that the video display may include the incorrect data. So, in response to the visual indicium being drag-and-dropped, the application displays data having meanings corresponding to the visual indicia in the second region, which contains the indicia of the active filters.

Step 1130 may be accomplished in three parts, although an embodiment of the invention need not be limited to this exemplary implementation. First, the application determines which filters correspond to the visual indicia in the second region. Second, the application applies these filters to the underlying dataset, and forms a display subset of data according to the rules for combining the subsets of data that the filters respectively select, as discussed in connection with FIGS. 7A and 7B. Third, the application renders and displays, on one or more video display, 3D objects that visually represent the data in the display subset.

FIGS. 12A and 12B pictorially represent an example graphical user interface during a drag-and-drop operation. In particular, FIG. 12A shows a video display in the middle of a drag operation. Ribbon 1210 contains several visual indicia 1220, 1222, 1223, 1224 for filters, which are labeled "Piping Components", "Drawing Feature", "Hangers & Supports", and "Structure" respectively. Further, Ribbon 1210 shows a left-caret to the left of the indicium 1220, which may be selected by the operator to display additional filters. An operator has selected the "Structure" visual indicium, and is dragging it to the left. As can be seen in the screen capture, the "Structure" visual indicium has been drawn twice, once in the second ribbon as indicium 1224, and once as indicium 1230 which is in a fainter color at the visual location of the pointing device (i.e., the mouse cursor) on the screen. In addition, the ribbon 1210 contains a yellow, vertical cursor 1240 that represents the location of the dragged visual indicium in the list, should the operator perform a drop operation. Note that during the drag operation, the "Structure" filter has not been applied to the displayed 3D objects. Rather, only the "Electrical" filter has been applied, as shown by the display of certain components in the distinctive color associated with that filter's indicium.

FIG. 12B shows the video display after the operator has dropped the dragged visual indicium 1230 at the location of cursor 1240. The GUI now shows the same set of visual indicia in the second ribbon in a different order, with the "Structure" indicium 1230 now in second position instead of fourth position. The "Piping Components" indicium 1220 has not moved, while the "Drawing Feature" and "Hangers & Supports" indicia 1222, 1223 have moved to the right to occupy the empty space left by the "Structure" indicium 1224, which is no longer visible. Although FIGS. 12A, 12B show the effects of an operator organizing the visual indicia within a single ribbon, various embodiments of the invention allow an operator to drag a visual indicium from one ribbon to drop it in another ribbon.

An operator may use various features to organize the visual indicia within a single ribbon. For example, the operator may use a particular filter frequently, and desire to place the visual indicium for that filter at the beginning of the ribbon's display area. This desire may be fulfilled using a drag-and-drop operation. Or, the operator may wish to apply an automatic sort criteria to the filters, such as sort-by-frequency used. Such a sort criterion directs the application to sort the visual indicia automatically, without further operator intervention. An operator may configure sort criteria using a function of the graphical application, such as an option in a drop-down menu, by selecting an icon on the video display, by editing scripts in a dialog window or in a text file, or by other means known in the art.

Figure 13A:
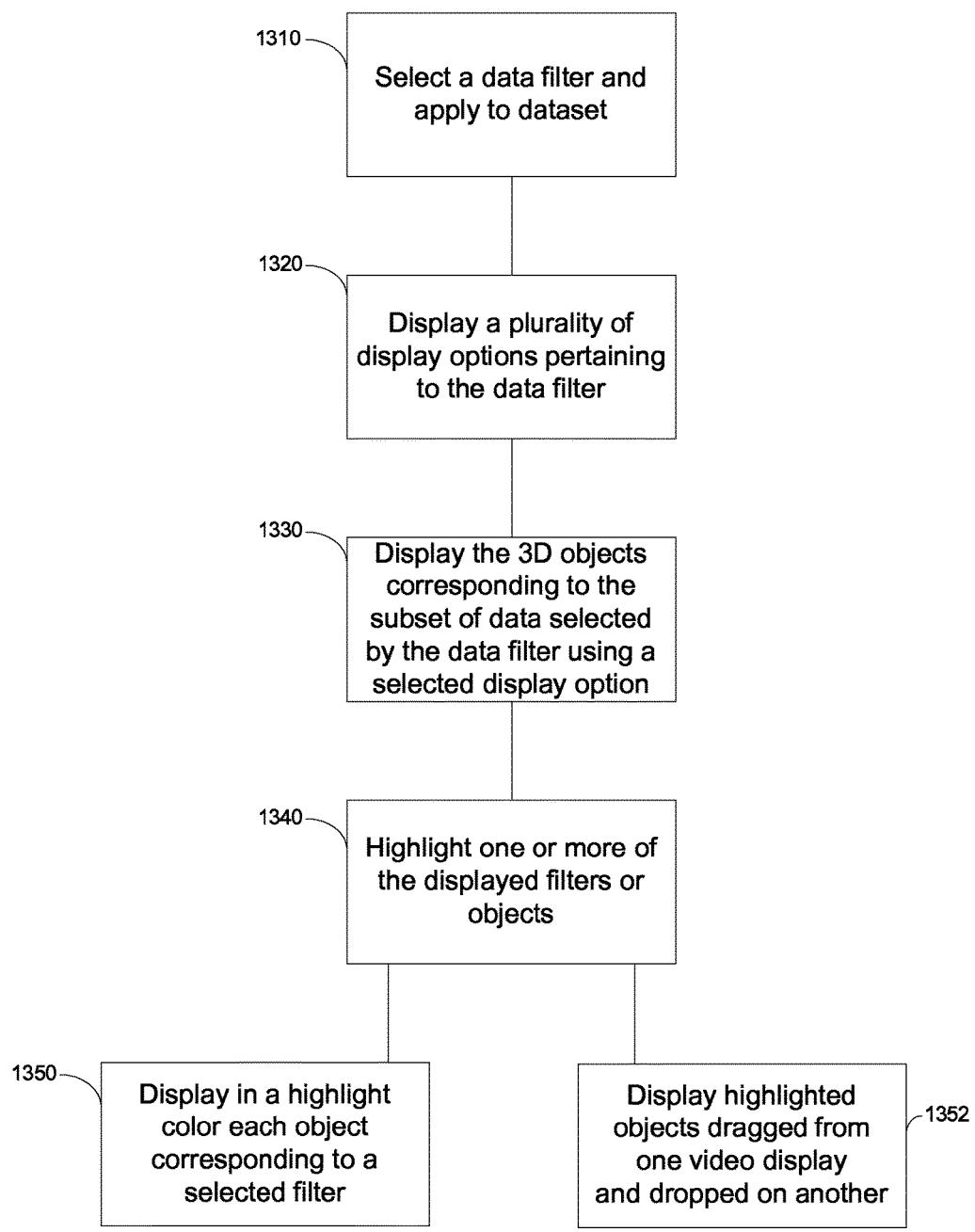
FIG. 13A shows one embodiment of a process for displaying filtered data on a video display according to user-customizable display choices.

FIG. 13A shows one embodiment of a process for displaying filtered data on a video display according to user-customizable display choices. In the first step 1310 of the process, an application receives an operator selection of a data filter, and applies that data filter to the dataset to obtain a subset of data, as described in detail above.

In the next step 1320, the application displays a plurality of display options pertaining to the data filter. For example, a display option may include a selection of colors to apply to data selected by the filter during display of the data. The application may use the same color in the visual indicium within a ribbon that represents the selected filter, to provide the operator a visual reference. Another display option may be whether or not to display data not selected by the given data filter. Another display option may be whether to display the unfiltered data in a neutral color. Another display option may be whether to display the unfiltered data using translucency. These display options need not be mutually exclusive—for example, if unfiltered data is selected for display, the application may display it both in a neutral color and with a degree of translucency. A person having ordinary skill in the art may conceive of numerous other display options that fall within the scope of the invention.

Figure 13B:
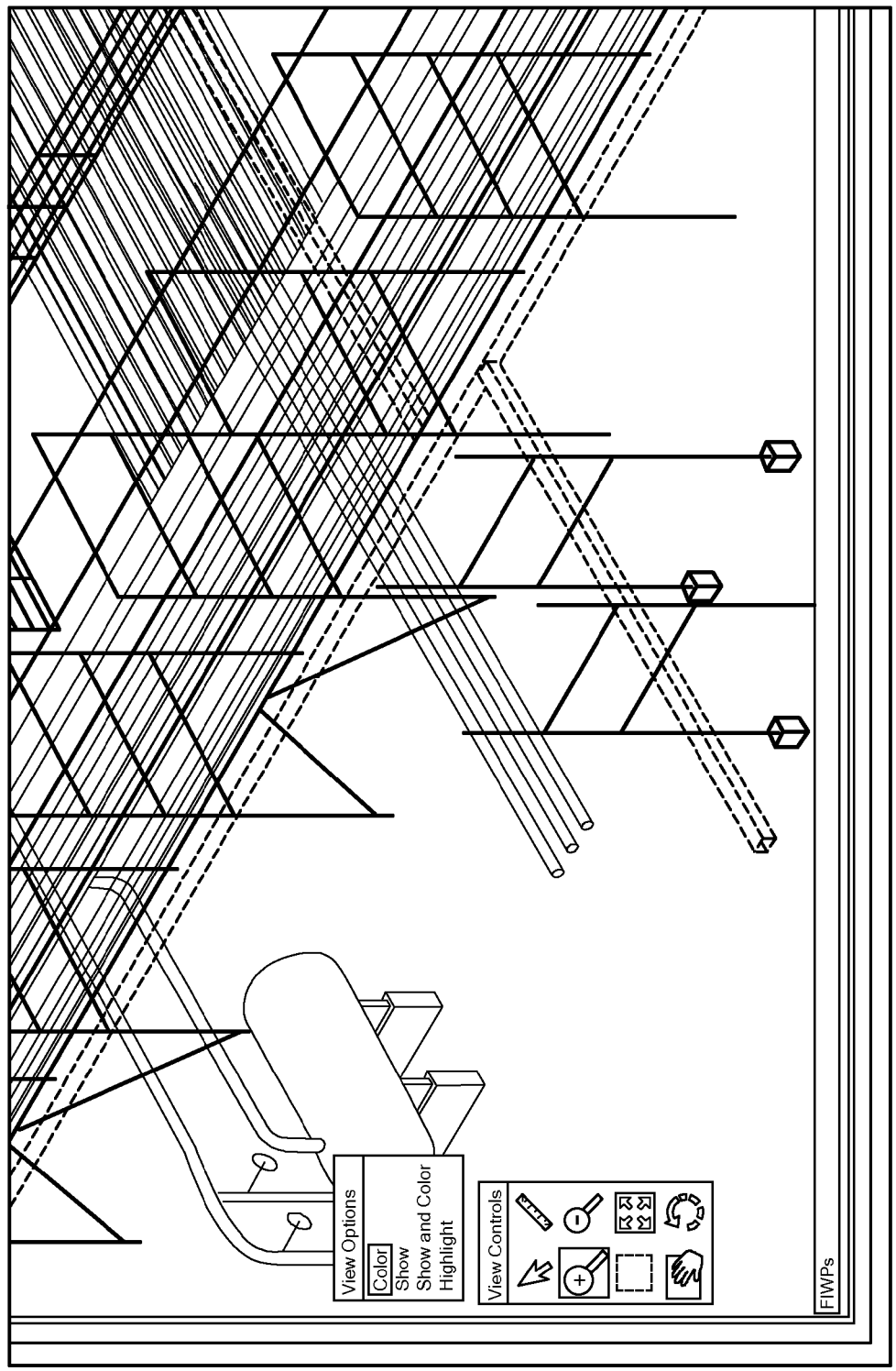
FIG. 13B shows an exemplary graphical user interface that can perform the process of FIG. 13A.

In step 1330, the application displays the 3D objects corresponding to the subset of data selected by the data filter, using a display option selected by the operator from the plurality of display options. Thus, if the operator chooses to hide unfiltered data, then the application only displays data selected by the filters currently being applied. An example of such a display is shown in FIG. 13B. In this exemplary figure, the "View Options" box is visible, and the "Color" view option has been selected. Thus, in accordance with the process just described, a particular set of 3D model data are displayed in color. In FIG. 13B, these data are displayed in dashed lines (representing the color white), while the non-selected data are displayed in a neutral, gray wireframe.

Figure 13C:
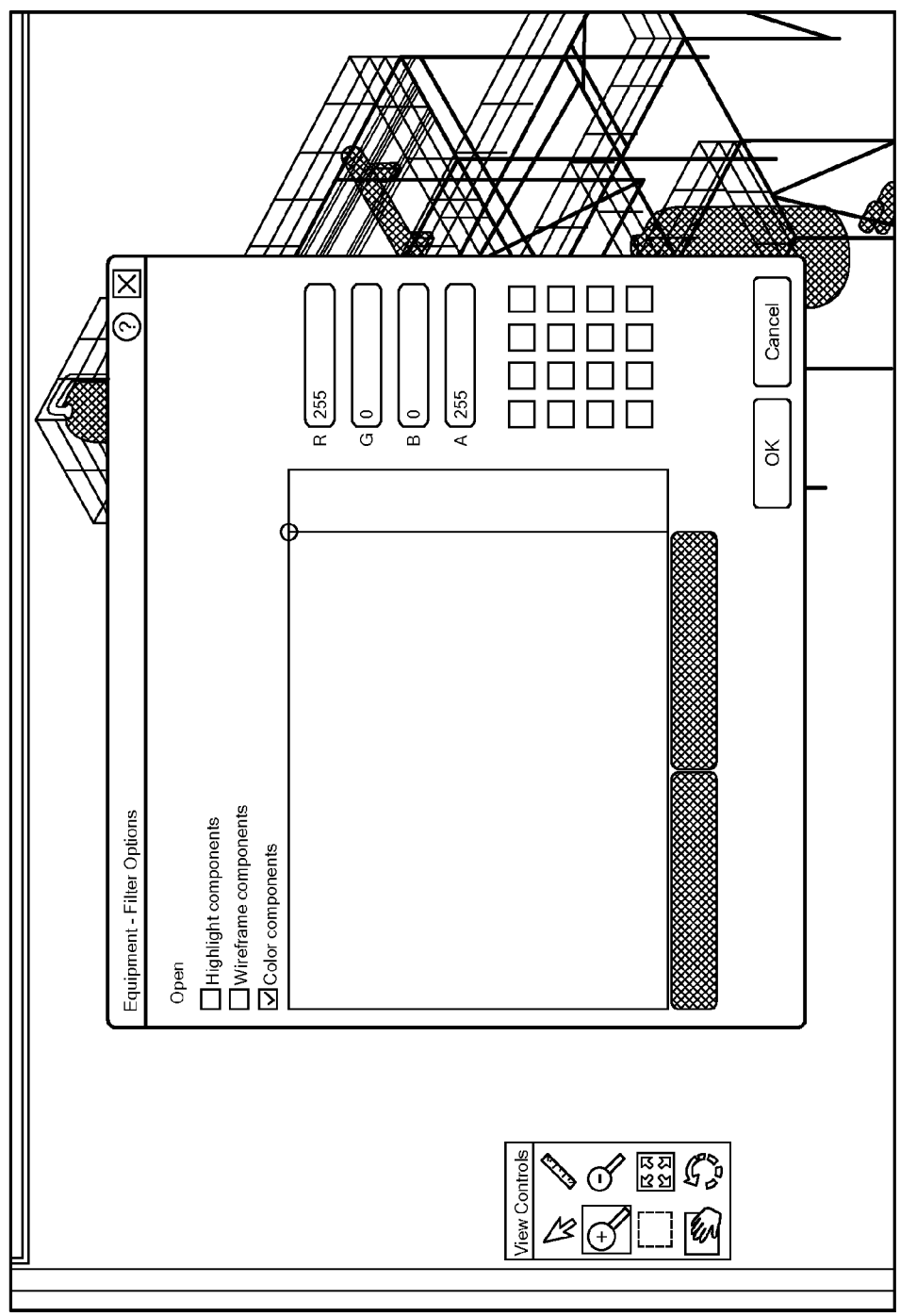
FIG. 13C shows an exemplary graphical user interface providing a color selection tool to allow an operator to select a color.

Other colors may be selected, for example using an interface such as that shown in FIG. 13C. In this figure, a box labeled "Equipment—Filter Options" is displayed for allowing the operator to select the color and transparency associated with the "Equipment" filter indicium and 3D objects on the display. A color wheel or color space as known in the art is displayed in the large box, and a circular cursor (shown in the upper right of the main box) indicates which color the operator has selected. A rainbow of colors is normally displayed in the smaller rectangle to the right. Clicking a color in the rainbow changes the dominant color shown in the color square. The red, green, blue, and alpha (RGBA) color components of the selection are shown to the right. In FIG. 13C, the color selected is completely opaque red, as indicated by the RGBA components (255,0,0,255). Below these, 16 color swatches are shown. Typically, these represent the most recently selected colors. Below the main color square are two bottom boxes. The left bottom box shows the previously selected color for this filter, while the right bottom box shows the currently selected color.

Returning to FIG. 13A, in step 1340 the operator may select or highlight a displayed 3D filter or object, for example by clicking on it with a pointing device, to enable further processing. In a further step, the application highlights one or more of the displayed objects in response to an operator selection. In one embodiment, the process continues to step 1350. In this embodiment, when the operator selects a filter, the application displays, in a user-selectable color, each object corresponding to that selected filter. This functionality is similar to that described in connection with FIGS. 6B and 6C, although accomplished in a different way. To be specific, in the embodiment of FIG. 6, the application displays 3D objects corresponding to active filters, displaying each object in a color that corresponds to a particular filter. In the present embodiment, the application uses the active filters to select objects for display in a neutral color, and only after the operator selects an individual, active filter for a second time are its corresponding objects shown in a user-selectable color corresponding to that filter.

In another embodiment of the invention, the process continues to alternate step 1352. In this embodiment, the operator selects a 3D object using the pointing device, and performs a drag-and-drop operation on that object between different video displays. This embodiment allows an operator to work on different locations of a single, virtual environment at the same time. For example, one location could be a staging area, where an operator creates, spatially orients, and adjusts the properties of 3D objects, before dragging them into position in the second location.

Figure 14:
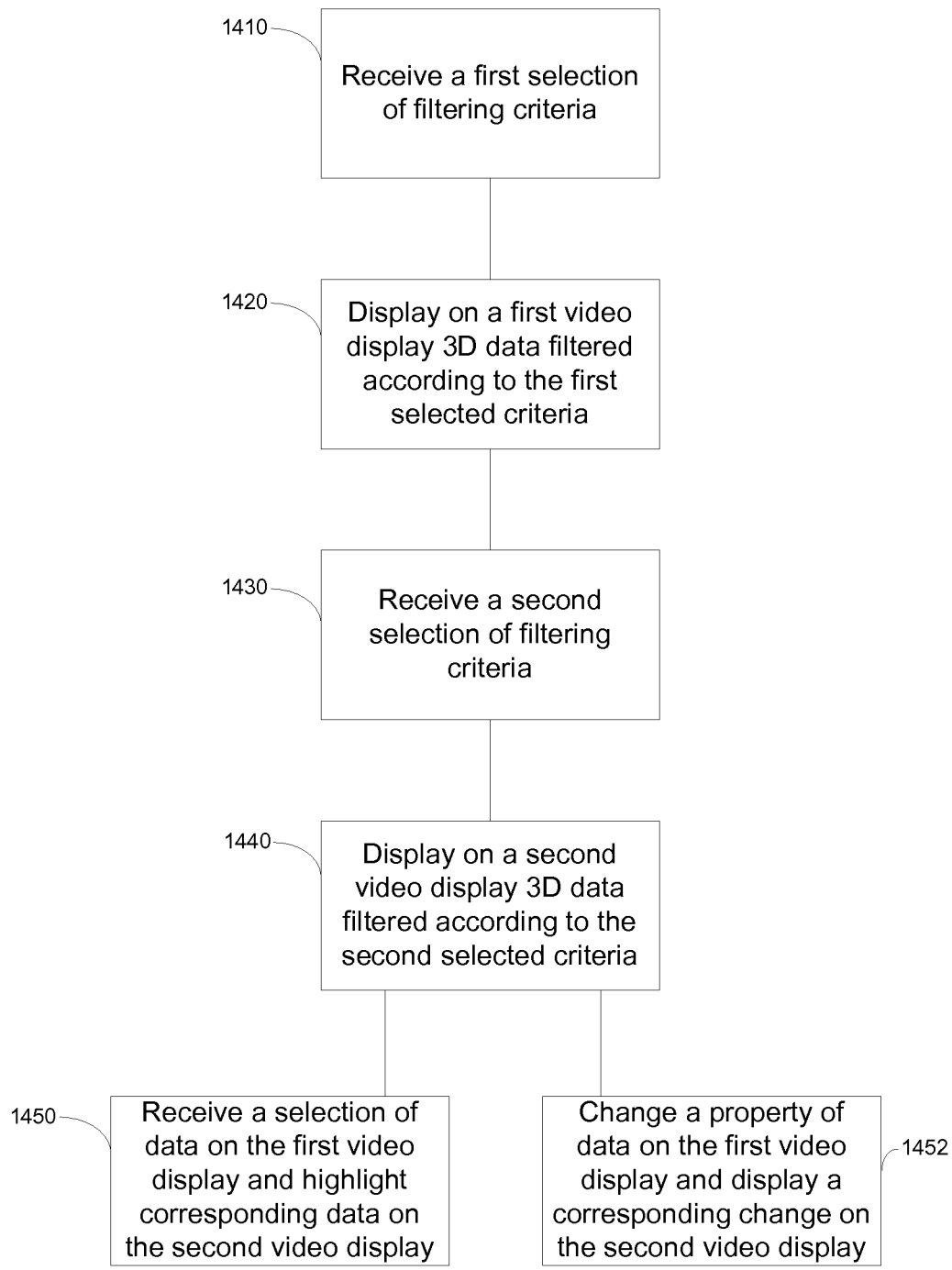
FIG. 14 shows one embodiment of a process for displaying filtered data from a single dataset on several video displays simultaneously.

FIG. 14 shows one embodiment of a process for displaying filtered data from a single dataset on several video displays simultaneously. In the first step 1410 of this process, a graphical application receives a first selection of filtering criteria from an operator, and in the second step 1420, the application displays the 3D object data corresponding to the filtering criteria on a first video display. These steps 1410, 1420 may be done in accordance with the process shown in FIG. 6A. In step 1430, the application receives a second selection of filtering criteria, and in step 1440 the application displays the 3D object data corresponding to these second criteria on a second video display. Again, these steps 1430, 1440 may be done following the process shown in FIG. 6A. However, it will be understood that in accordance with this process, the application applies each selection of filtering criteria to the same dataset, even though the 3D object data are displayed on multiple video displays. Thus, the displayed 3D objects may be thought of as existing in the same virtual environment that is being realized on two or more video displays. Furthermore, the first and second selections may be made by a single operator, or by different operators, who may be working at a single workstation or at multiple workstations. In an exemplary use of this embodiment, for example, all of the pipes in an industrial plant may be shown on one video display, and all of the electrical wiring in the same plant may be shown on the second video display.

The graphical application may be configured to show 3D object data on multiple displays using the same linear scale and slightly different perspectives. If so, an operator may view a three-dimensional stereoscopic image of the plant by treating two video displays as a stereogram. Because the application may be configured to show different data in different colors, the two video displays may be used to create anaglyphic images for use with colored 3D glasses. If the video displays emit polarized light, then polarized 3D glasses may be used to achieve the same effect.

The application may also be configured for a variety of linear scales on any number of video displays. For example, one video display may show an overall view of a 3D model, while the second video display shows a close-up view of a particularly interesting area of the virtual environment. Such an arrangement would allow an operator to design a detailed, complex 3D object one region at a time, while still maintaining a feel for the aesthetics or design parameters for an entire design project.

In a related embodiment, the process of FIG. 14 proceeds to step 1450, in which an operator selects a 3D object on one video display, and the application highlights a corresponding 3D object on another video display. In this embodiment, an operator may select a particular component of a detail area on the detail display, and see its location in the virtual environment highlighted on the overview display, thereby providing the operator with a sense of how the component fits into the overall design project. Or, a global design operator may select certain components on one display that become highlighted on a component operator's display as an indication that the component operator should update the component.

In another related embodiment, the process of FIG. 14 proceeds to alternate step 1452. In this step, after an operator selects an object shown on one video display and alters its properties, the application displays a corresponding change on the other video display. For example, if the operator drags a 3D object from one location to another on one video display, the application causes the other video display to show the new location of the object (provided that the object's new location is within the current viewing frustum of the other display). Or, if the operator changes the color of a particular object using the portion of the GUI displayed on one video display, then the application displays the object using the new color on the other video display.

Ontological Filtering Spatial Boundaries

In addition to the above exemplary embodiments, ontologies in a graphical application may be used in other ways. For example, each 3D object represented by data in the application may contain geometric or topological attributes, including a length, width, height, and a bounding box. Once a particular object of interest has been located by an operator using the ontological filtering techniques described above, various queries about that object's geometric data may be performed.

For example, if a drum containing volatile chemicals is selected in the graphical user interface, an operator may wish to know how far that drum is from any potential sources of ignition. In accordance with some embodiments of the invention, the graphical application may perform an ontological query to determine all sources of ignition, and calculate the distance between these sources and the selected drum. The results of this calculation may be displayed in a result box in the graphical application, or a collection of the nearest such sources may be graphically highlighted on the video display.

More generally, various embodiments of the invention permit an operator to perform complex queries that combine the features of both ontological filters and geometric relationships. The exemplary query of the previous paragraph was a one-to-many query: for a particular drum, many potential sources of ignition were located. Embodiments of the invention need not be so limited. A many-to-many query may also be formed. Thus, an operator may direct the graphical application to show all drums containing volatile chemicals that are within a certain distance (e.g., two meters) of an ignition source. As different chemicals have different ignition temperatures, the distances may be varied according to the type of chemical the operator is interested in. In fact, this is only one example of the types of queries that may be performed in accordance with embodiment of the invention. Thus other queries may include "how far is the top of this instrument panel from the ceiling?", "where is the oxygen shut-off valve nearest to this reaction vessel?", "how far is it from the control center to the hazardous operations area?" and so on. Persons having ordinary skill in the art may see how to form any number of queries connecting objects having ontological meanings to other such objects using a geometrical relationship. Embodiments of the present invention allow such persons to execute these queries in a graphical application.

Figure 15:
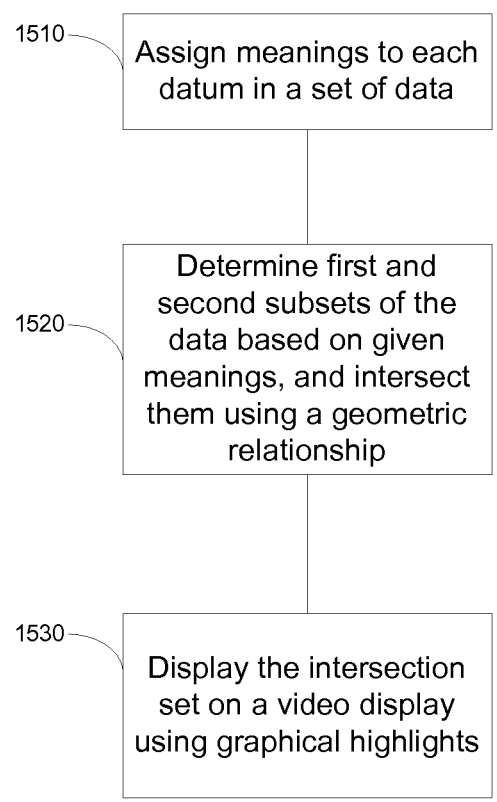
FIG. 15 is a flowchart showing steps in a computerized embodiment of the invention for selecting data representing three-dimensional objects for display on a video display.

FIG. 15 is a flowchart showing steps in a computerized embodiment of the invention for selecting data that represents three-dimensional objects for display on a video display. In step 1510, one or more individuals assigns meanings to each datum in a set of data that represent three-dimensional objects. As described above in connection with FIGS. 9 and 10, these meanings form an ontology which may be used to describe and model the object instances, classes, and roles in a design project. Next, in step 1520 a computer process performs a query to determine the intersection of two subsets of the set of data. Each of the two subsets pertain to an ontological meaning. Thus, for example, the first meaning could be "heat riser" and the second meaning could be "fuel line," and the two subsets of data would represent all heat risers and all fuel lines, respectively. Also in step 1520, these two subsets are intersected in a computer process, forming a third subset. The members of this third subset include data in the first subset that satisfy a given geometric relationship with at least one datum in the second subset. The geometric relationship may be, for example, a distance relationship, such as "within 2 meters." In this case, if the first subset is the set of all "heat risers" and the second subset is all "fuel lines," then the third subset is the collection of all heat risers that are within 2 meters of at least one fuel line. Other geometric relationships may be defined, for example "above" or "below"; "larger" or "smaller"; "tilted with respect to"; "near to" or "far from"; or any other geometric relationship. This list is only exemplary—a skilled person may see many other geometric relationships that may be used. Finally, in step 1530 the third (intersected) subset is displayed on a video display, using graphical highlights to distinguish this subset from other visual data. Such graphical highlights may include, among other things, dimming the brightness of non-selected data, so the third subset appears brighter than the remaining displayed data. Any method for highlighting visual data may be used.

Figure 16A:
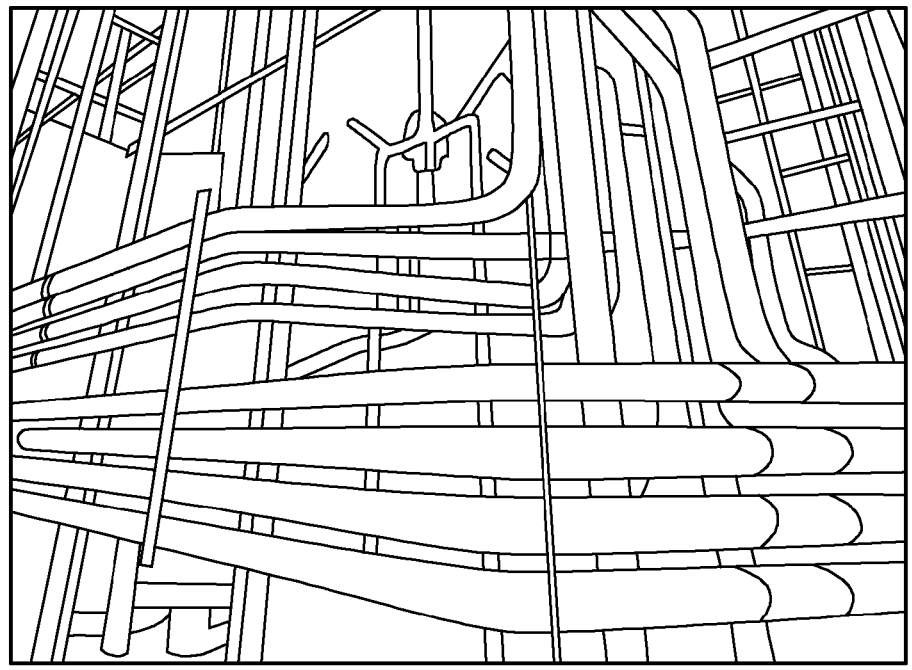
FIG. 16A is a display of a complete set of data representing three-dimensional objects.
Figure 16B:
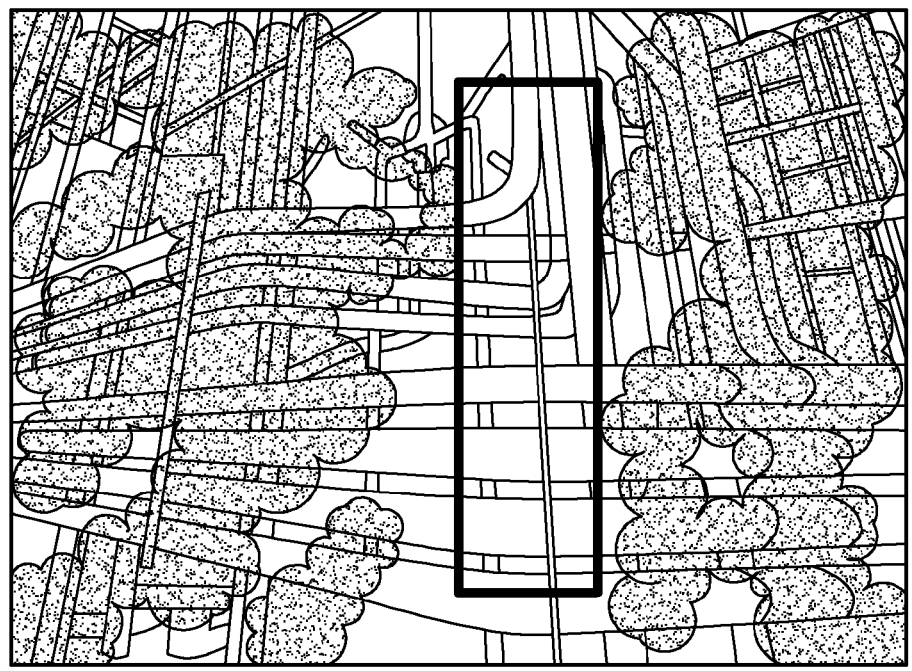
FIG. 16B is the display of FIG. 16A that highlights certain selected data, in accordance with an embodiment of the invention.

An example of the effects of performing the exemplary method embodiment of FIG. 15 is shown in FIGS. 16A and 16B. FIG. 16A is a display of a set of data representing three-dimensional objects (input ribbons are not shown for clarity). As can be seen, the three-dimensional objects are primarily pipes, located within a building. An operator may perform a query against the objects represented in this display, for example to determine any heat sources within two meters of a fuel line. The results of this query are shown in FIG. 16B, in which the portions of the 3D objects that were not selected by the query (i.e., that are not heat sources within two meters of a fuel line) are grayed out. The heat source itself (a heat riser) is shown with a red bounding box, assisting the operator in finding the fuel line and the heat sources. As a result of performing this query, the operator may decide that the arrangement of the pipes in the building is problematic, and undertake steps to correct the design in the graphical application before the building is actually constructed.

Embodiments of the invention may use any kind of video display, including one that only displays two-dimensional objects, such as blueprints. In accordance with a two-dimensional embodiment, an operator performs a complex query, for example by the process shown in FIG. 15. The list of object instances that match the query have 3D bounding boxes, which may be mapped into two dimensions using methods known in the art, such as discarding one of the three coordinates. In a typical embodiment, such as a blueprint, there may be several views, and the coordinate that is discarded may depend on the view. For a plan view that only requires x- and y-coordinates, the z-coordinate is discarded. For an elevation view, an x- or y-coordinate is discarded.

To be more specific, an object instance that matches a particular ontological and geometrical query may have a three-dimensional bounding box defined by the opposing corners having coordinates (1, 2, 3) and (10, 20, 30). In a plan view, the z-coordinate is discarded, and the two-dimensional bounding box for display is defined by the points (1, 2) and (10, 20). However, in a front elevation view, discarding the x-coordinate results in a bounding box defined by (2, 3) and (20, 30), while in a side elevation view, discarding the y-coordinate results in a bounding box defined by (1, 3) and (10, 30). It is then a relatively straightforward matter to overlay the particular bounding box on the respective two-dimensional display, using techniques well-known in the art.

The resulting two-dimensional display may be shown in the graphical application, or it may be shown in another application. For example, a construction engineer may have an electronic copy of the as-designed blueprints at a construction site as a PDF file. The engineer may receive as-built data representing a building under construction from a laser scan. In accordance with an embodiment of the invention, the engineer performs a query against this data using an appropriate software package. The results are then used to generate a second PDF file showing the query results as an overlay on the original blueprints. In this manner, differences between the as-designed and as-built project may be determined smoothly and efficiently. This kind of two-dimensional display advantageously may be used with, for example, a portable electronic device such as a laptop or a touch-screen computer, permitting (for example) a safety inspector to perform an on-site inspection using both sets of blueprints.

The ability to perform complex ontological and geometrical queries may be of tremendous value throughout the life-cycle of a construction project. During the initial design phase, where an operator uses a graphical application to lay out all of the physical components of the project, problems with the design (such as heat sources too near volatile chemicals) may be detected and corrected. As described above, process engineers on-site can compare the project's as-built specifications against the design plan during the construction phase. During turnover and commissioning, a standards compliance engineer may query the data using an ontology that is appropriate to the particular standard for which compliance is sought. Thus, ontological queries regarding anything that the operator arbitrarily chooses may be performed. Once an owner-operator has assumed control of a facility, ontological queries may be performed to assist in employee safety training, and during facility inspections. If a mishap occurs, an emergency first responder may perform an ontological query against the blueprint data to determine, for instance, where the nearest water main is located. A person have ordinary skill in the art may appreciate other ways in which embodiments of the present invention can be used, including various ways to reduce the cost of a construction project.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof. In a typical embodiment of the present invention, some or all of the described logic is implemented as a set of computer program instructions that is converted into a computer executable form, stored as such in a computer readable medium, and executed by a microprocessor within a computer under the control of an operating system.

Computer program logic implementing all or part of the functionality previously described herein may be embodied in various forms, including, but in no way limited to, a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form. The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL). Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device. The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

The embodiments of the invention described above are intended to be merely exemplary. While there have been shown and described fundamental novel and non-obvious features of embodiments of the invention, it will be understood that various omissions, changes, and substitutions in the form and details of the methods and apparatus illustrated, and in their operation, may be made by those skilled in the art without departing from the spirit of the invention. All such variations and modifications are intended to be within the scope of the present invention as defined in any appended claims.

What is claimed is:

1. A method of displaying 3D model data on a video display, the data belonging to a dataset, each datum in the dataset having one or more attributes, the method comprising:
    defining a plurality of data filters and a plurality of filtering levels, each data filter having a filtering level and being capable of filtering the data in the dataset as a function of at least one attribute; and
    in response to receiving a first selection of at least two of the data filters having a first level, determining, for display on the video display, a subset of 3D model data in the dataset, the subset being defined by the first selected data filters,
    directing to the display, in response to receiving a request relating to at least one of the first selected data filters, information indicating a plurality of data filters associated with the at least one first selected data filter, each indicated data filter having a second level that is the same level as each of the other indicated data filters but different from the first level; and
    directing to the display on the video display a second subset of 3D model data in the dataset, the second subset being defined by at least one of the indicated data filters.

2. The method according to claim 1, further comprising displaying the subset of 3D model data on the video display.

3. The method according to claim 1, wherein the defined plurality of data filters comprises one of: a hierarchical tree of data filters and a plurality of ontological data filters.

4. The method according to claim 1, wherein the first level comprises a plurality of different filtering levels.

5. The method according to claim 1, wherein the subset of 3D model data is defined as the intersection of the subsets of data defined by the at least one attribute in each of data filters in the selected plurality.

6. The method according to claim 1, wherein the subset of 3D model data is defined as the union of the subsets of data defined by the at least one attribute in each of data filters in the selected plurality.

7. The method according to claim 6, further comprising displaying the data defined by the at least one attribute in a given data filter in a color uniquely associated with the given data filter.

8. The method according to claim 1 further comprising displaying the data of the second subset in a user-selectable color.

9. The method according to claim 1 further comprising displaying an exploded view, a cross-sectional view, or an enlarged view of the data of the second subset.

10. A computer program product, for use on a computer system, for displaying 3D model data on a video display, the data belonging to a dataset, each datum in the dataset having one or more attributes, the computer program product comprising a non-transitory, tangible computer-readable storage medium having program code thereon, the program code comprising:
    program code for defining a plurality of data filters and a plurality of filtering levels, each data filter having a filtering level and being capable of filtering the data in the dataset as a function of at least one attribute;
    program code for receiving a first selection of a plurality of data filters having a first level; and
    program code for causing the display on the video display of a subset of 3D model data in the dataset, the subset being defined by the first selected data filters in response to receiving the first selection,
    program code for directing to the display, in response to receiving a request relating to at least one of the first selected data filters, information indicating a plurality of data filters associated with the at least one first selected data filter, each indicated data filter having a second level that is the same level as each of the other indicated data filters but different from the first level; and
    program code for directing to the display on the video display a second subset of 3D model data in the dataset, the second subset being defined by at least one of the indicated data filters.

11. The computer program product according to claim 10, wherein the defined plurality of data filters comprises a set of data filters, a hierarchical tree of data filters, or a plurality of ontological data filters.

12. The computer program product according to claim 10, wherein the first level comprises a plurality of different filtering levels.

13. The computer program product according to claim 10, wherein the subset of 3D model data is defined as the logical intersection of the subsets of data defined by the at least one attribute in each of data filters in the selected plurality.

14. The computer program product according to claim 10, wherein the subset of 3D model data is defined as the logical union of the subsets of data defined by the at least one attribute in each of data filters in the selected plurality.

15. The computer program product according to claim 14, further comprising program code for displaying the data defined by the at least one attribute in a given data filter in a user-selectable color that is uniquely associated with the given data filter.

16. The computer program product according to claim 10, further comprising program code for displaying the data of the second subset in a user-selectable color.

17. The computer program product according to claim 10, further comprising program code for displaying an exploded view, a cross-sectional view, or an enlarged view of the data of the second subset.

\* \* \* \* \*